(12) United States Patent
Vrzic et al.

(10) Patent No.: US 10,419,988 B2
(45) Date of Patent: Sep. 17, 2019

(54) DISTRIBUTED GATEWAYS AND METHODS

(71) Applicant: Huawei Technologies Co., Ltd., Shenzhen (CN)

(72) Inventors: Sophie Vrzic, Kanata (CA); Jaya Rao, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/923,634

(22) Filed: Mar. 16, 2018

(65) Prior Publication Data
US 2018/0206159 A1    Jul. 19, 2018

Related U.S. Application Data

(63) Continuation of application No. PCT/CN2016/099230, filed on Sep. 18, 2016, which
(Continued)

(51) Int. Cl.
*H04W 36/02* (2009.01)
*H04W 36/32* (2009.01)
(Continued)

(52) U.S. Cl.
CPC ......... *H04W 36/023* (2013.01); *H04W 36/32* (2013.01); *H04W 36/0066* (2013.01); *H04W 76/27* (2018.02); *H04W 88/16* (2013.01)

(58) Field of Classification Search
CPC . H04L 29/08639; H04L 67/148; H04L 47/31; H04L 47/32; H04L 49/70;
(Continued)

(56) References Cited

U.S. PATENT DOCUMENTS 8,594,061 B2    11/2013 Kennedy et al.
9,930,587 B2 *  3/2018 Vrzic ................. H04W 36/023
(Continued)

FOREIGN PATENT DOCUMENTS

CN    1703103 A    11/2005
CN    101247543 A   8/2008
(Continued)

OTHER PUBLICATIONS

"5G Wireless Network: MyNet and SONAC"; Zhang et al.; IEEE 0890-8044/15, Jul. 8, 2015 (Year: 2015).*
(Continued)

*Primary Examiner* — Benjamin H Elliott, IV
(74) *Attorney, Agent, or Firm* — Slater Matsil, LLP

(57) ABSTRACT

Aspects of the disclosure provide systems and methods for establishing one or more Distributed Gateways located close to a location of a UE to facilitate faster packet delivery to the UE during transitions. Such transitions can include the UE transitioning its state, for example from being idle to connected to the network, but also includes operations in which the serving AP(s) for the UE changes. The method includes establishing at least two virtual network function (VNF) components (VFNCs) of a distributed gateway (D-GW), each VNFC associated with an access point (AP). Each VNFC buffers packets directed to the wireless device. The method further includes selecting at least one AP for serving the wireless device, and forwarding the buffered packets from the VNFC associated with the selected APs to the selected APs for forwarding to the wireless device. Packets buffered at the VNFCs of non-selected APs are discarded.

20 Claims, 18 Drawing Sheets

Related U.S. Application Data is a continuation of application No. 14/863,286, filed on Sep. 23, 2015, now Pat. No. 9,930,587.

(60) Provisional application No. 62/220,682, filed on Sep. 18, 2015.

(51) Int. Cl.
- *H04W 36/00* (2009.01)
- *H04W 88/16* (2009.01)
- *H04W 76/27* (2018.01)

(58) Field of Classification Search
CPC ........... H04L 29/0621; H04L 29/06224; H04L 29/06251; H04L 65/1013; H04L 65/102; H04L 65/1033; H04W 88/16; H04W 36/02; H04W 36/023

See application file for complete search history.

(56) References Cited

U.S. PATENT DOCUMENTS

| | | | |
|---|---|---|---|
| 2002/0131400 A1 | 9/2002 | Tinsley et al. | |
| 2005/0259619 A1 | 11/2005 | Boettle et al. | |
| 2010/0136994 A1 | 6/2010 | Yong et al. | |
| 2011/0310865 A1 | 12/2011 | Kennedy et al. | |
| 2011/0310899 A1 | 12/2011 | Alkhatib et al. | |
| 2012/0178414 A1 | 7/2012 | Fiatal | |
| 2014/0201374 A1 | 7/2014 | Ashwood-Smith et al. | |
| 2014/0281030 A1* | 9/2014 | Cui | H04L 43/026 709/244 |
| 2014/0321328 A1* | 10/2014 | Zuniga | H04W 8/06 370/254 |
| 2015/0058938 A1 | 2/2015 | Gaspar | |
| 2015/0124622 A1 | 5/2015 | Kovvali et al. | |
| 2015/0180730 A1 | 6/2015 | Felstaine et al. | |
| 2015/0288541 A1 | 10/2015 | Fargano et al. | |
| 2016/0006696 A1* | 1/2016 | Donley | H04L 63/0236 709/223 |
| 2016/0048403 A1 | 2/2016 | Bugenhagen | |
| 2016/0127169 A1* | 5/2016 | Rosa de Sousa Teixeira | H04L 41/5025 370/216 |
| 2016/0127975 A1 | 5/2016 | Hu et al. | |
| 2016/0134472 A1 | 5/2016 | Guan et al. | |
| 2016/0234082 A1 | 8/2016 | Xia et al. | |
| 2016/0269925 A1* | 9/2016 | Chou | H04W 28/0226 |
| 2016/0330140 A1* | 11/2016 | Cook | H04B 10/27 |
| 2016/0344587 A1 | 11/2016 | Hoffmann | |
| 2017/0017510 A1 | 1/2017 | Itoh et al. | |
| 2017/0034756 A1 | 2/2017 | Faccin et al. | |
| 2017/0086049 A1* | 3/2017 | Vrzic | H04L 67/327 |
| 2017/0086111 A1 | 3/2017 | Vrzic et al. | |
| 2017/0142206 A1 | 5/2017 | Kodaypak et al. | |
| 2017/0311228 A1 | 10/2017 | Zavesky et al. | |
| 2017/0324612 A1* | 11/2017 | Perez | H04L 41/0806 |
| 2018/0070262 A1* | 3/2018 | Nakano | H04W 28/24 |
| 2018/0206159 A1* | 7/2018 | Vrzic | H04W 36/023 |
| 2018/0213453 A1* | 7/2018 | Vrzic | H04W 36/023 |

FOREIGN PATENT DOCUMENTS

| | | |
|---|---|---|
| CN | 103081525 A | 5/2013 |
| CN | 103491129 A | 1/2014 |
| CN | 104202264 A | 12/2014 |
| CN | 104410672 A | 3/2015 |
| CN | 104579732 A | 4/2015 |
| CN | 104811923 A | 7/2015 |
| EP | 2874448 A1 | 5/2015 |
| EP | 3107249 A1 | 12/2016 |
| EP | 3116175 A1 | 1/2017 |
| WO | 02060192 A2 | 8/2002 |
| WO | 2013082245 A1 | 6/2013 |
| WO | 2015118875 A1 | 8/2015 |
| WO | 2015122177 A1 | 8/2015 |
| WO | 2015133124 A1 | 9/2015 |

OTHER PUBLICATIONS

3rd Generation Partnership Project; Technical Specification Group Services and System Aspects; Feasibility Study on New Services and Markets Technology Enablers; Stage 1 (Release 14), 3GPP TR 22.891 V0.2.0, Aug. 2015, 73 pages.

3rd Generation Partnership Project; Technical Specification Group Services and System Aspects; Feasibility Study on New Services and Markets Technology Enablers; Stage 1 (Release 14) 3GPP TR 22.891 V1.0.0, Sep. 24, 2015, 74 pages.

'Network Functions Virtualisation (NFV); Use Cases, ETSI GS NFV 001 V1.1.1, Oct. 2013, 50 pages.

"Network Functions Virtualisation (NFV); Architectural Framework," ETSI GS NFV 002 V1.1.1, Oct. 2013, 21 pages.

* cited by examiner

Option 1: Without Anchor GW

Option 2: With Anchor GW

DISTRIBUTED GATEWAYS AND METHODS

CROSS-REFERENCE TO RELATED APPLICATIONS

This application is a continuation of PCT Patent Application No. PCT/CN2016/099230, entitled "Distributed Gateways," filed Sep. 18, 2016, which claims the benefit of U.S. patent application Ser. No. 14/863,286 entitled "Distributed Virtual Gateways" filed Sep. 23, 2015 (issuing as U.S. Pat. No. 9,930,587 on Mar. 27, 2018), which claims the benefit of U.S. Provisional Patent Application No. 62/220,682, entitled "System and Method for Reliable Communication with Mobility Along a Predictable Route," filed Sep. 18, 2015, all of which applications are hereby incorporated herein by reference in their entireties.

TECHNICAL FIELD

This disclosure relates to virtual network functions for wireless networks.

BACKGROUND

In fourth generation (5G) mobile networks, such as those based on Long-Term Evolution (LTE) standards specified by the Third Generation Partnership Project (3GPP), numerous functional elements are provided in the core network, also referred to as the Evolved Packet Core (EPC). In so-called 3G networks, these functions were provided by entities in the Packet Core (PC). These functions include User Equipment (UE) tracking and paging, and buffering and sending packets from the core network to the UE via an appropriate Access Point (AP), for example a Node B or an Evolved Node B (eNB). To reduce wireless resource consumption while providing capacity for many UEs, bearers capable of carrying packets are only established as needed. However, this results in packet delay while such bearers are established. There is also a delay when the UE undergoes a handover from one cell to another or one service area to another. When in a first service area, a UE is served by a first set of functional entities. When the UE transitions to a second service area, some of the functional entities serving the UE will change. During this handover, the data must be forwarded from the source node to the target node after the UE breaks the connection with the source node and connects with the target node. If the UE cannot establish a connection with the target node a Radio Link Failure may occur. This will cause further delay because the UE will need to perform a cell association again.

There is a need for an architecture which reduces the packet delay in establishing bearers and transmitting data to UE and reduces the handover delay.

SUMMARY

Aspects of the disclosure provide a system and method for establishing one or more Distributed Gateways located close to a location of a UE to facilitate faster packet delivery to the UE during transitions. Such transitions can include the UE transitioning its state, for example from being idle to connected to the network, but also includes operations in which the serving AP(s) for the UE changes.

An aspect of the disclosure provides a method of establishing network communication with a wireless device. The method includes establishing at least two virtual network function (VNF) components (VFNCs) of a distributed gateway (D-GW), each VNFC associated with an access point (AP). Each VNFC buffers packets directed to the wireless device. The method further includes selecting at least one AP for serving the wireless device, and forwarding the buffered packets from the VNFC associated with the selected APs to the selected APs for forwarding to the wireless device. Packets buffered at the VNFCs of non-selected APs are discarded. It should be appreciated that, in some embodiments, only one AP will serve a wireless device at any point in time, whereas other embodiments allow for more than one AP to serve the wireless device simultaneously.

Further embodiments can include receiving a trigger and changing the state of at least one VNFC in response to the trigger. This can involve changing the state of the same VNFC. For example, if the trigger indicates a likelihood that the wireless device is about to change from an idle to an active state (e.g., change from idle to connected to the wireless network), the method can change the state of a VNFC associated with a serving AP from not active to active. In other situations, the state of a different VNFC can change in response to a trigger. For example, if the wireless device moves towards another AP, then a VNFC associated this other AP can change.

Another aspect of the disclosure provides a Virtual Network Function Manager (VNFM) which includes a processor and machine readable memory storing executable instructions which, when executed by the processor, cause the VNFM to carry out the methods described herein. For example, the instructions can cause the VNFM to establish at least two VFNCs of a D-GW, each VNFC associated with an AP. The instructions can change the state of the VNFCs based on a trigger. In some embodiments, the executable instructions can cause the VNFM to further instantiate or terminate VNFCs as needed.

Another aspect of the disclosure provides for a method to migrate the resources of a VNF, the method executed by a VNFM. Such a method includes checking a Migrate Policy for a Migrate Trigger and making a Migrate Decision based on the Migrate Policy and the Migrate Trigger. Such a method further includes implementing a Migrate Response based on the Migrate Decision. In an embodiment, a VNFM can scale-out from a common gateway entity which serves a number of wireless devices to a distributed gateway which is user specific or service specific in response to information in a metric report from the common gateway entity. In an embodiment, the VNFM which causes such a scale out can be different from the VNFM which established the common gateway entity.

In an aspect, there is provided a method of controlling a gateway associated with the wireless device. The method comprises the steps of instructing the instantiation of a first distributed gateway (D-GW) virtual network function component (VNFC), associated with both the wireless device and a first access point (AP); instructing the instantiated D-GW to buffer packets directed to the wireless device without forwarding; and instructing the instantiated D-GW to discard the buffered packets. Optionally the method can include instantiating a second D-GW VNFC associated with a second AP; and instructing the instantiated second D-GW VNFC to buffer packets directed to the wireless device. In further optional embodiments the step of instructing the instantiated first D-GW VNFC to discard is performed in response to receipt of an indication that the wireless device has connected to an AP other than the first AP.

The foregoing and other objects, features, aspects and advantages of the present invention will become more apparent from the following detailed description, taken in conjunction with the accompanying drawings, which description is by way of example only.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION OF ILLUSTRATIVE EMBODIMENTS

Figure 1:
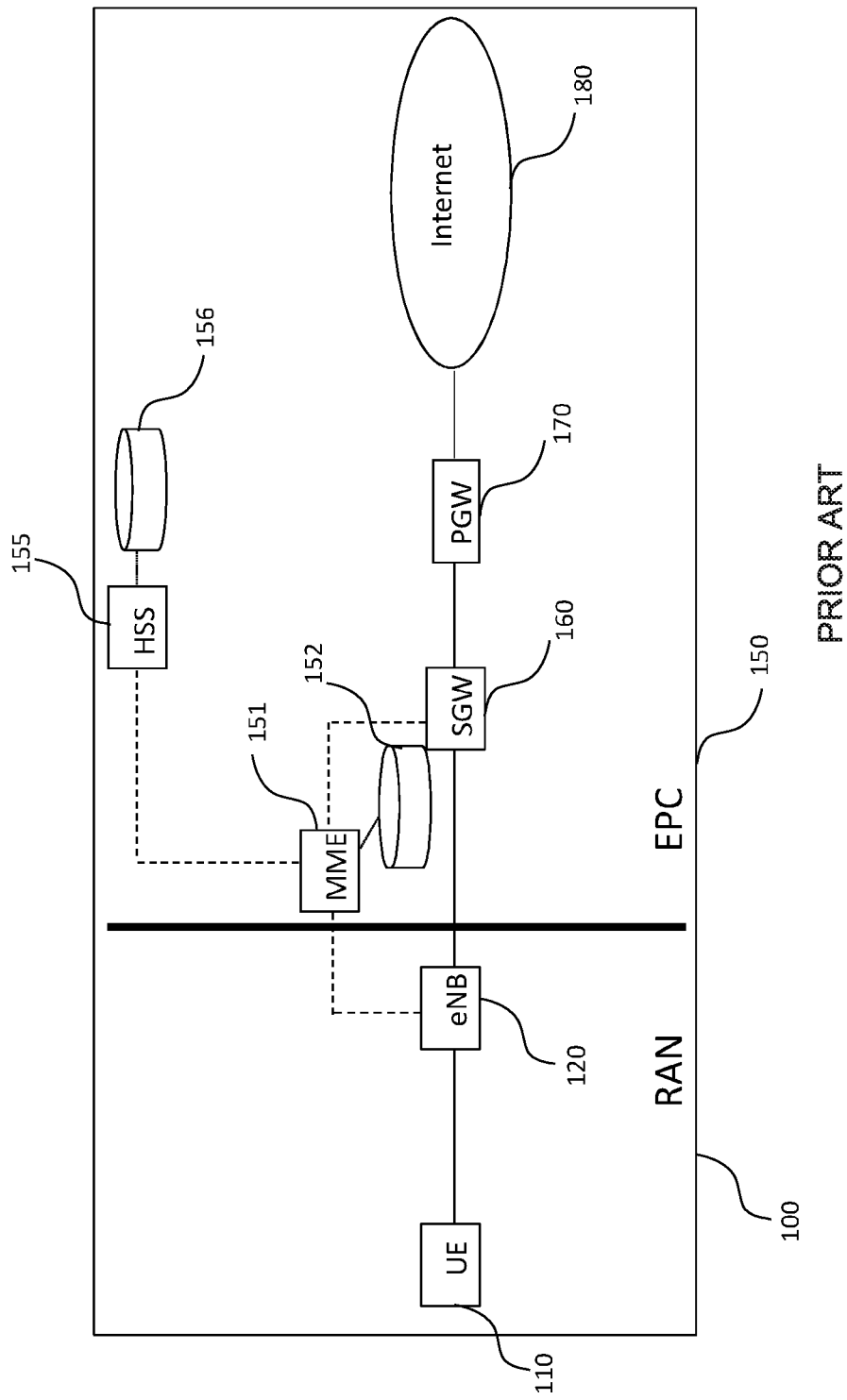
FIG. 1 is a block diagram of an LTE network.

Network Function Virtualization (NFV) allows a pool of computing resources to be used to instantiate virtual functions that to other nodes and to the traffic flows that they handle appears as physical nodes. This provides a mechanism to flexibly instantiate and manage network functions on an as needed basis. The NFV framework includes NFV Infrastructure (NFVI) which includes hardware resources, such as computing, storage and networking resources, a virtualization layer, and virtual computing, storage and networking resources. Virtual Network Functions (VNFs), such as software implementations of network functions, are capable of running atop the NFVI. NFV management and orchestration is also provided, which covers the orchestration and lifecycle management of physical and/or software resources that support the infrastructure virtualization and the lifecycle management of VNFs.

An instantiated VNF provides the services that would otherwise have been provided by a dedicated functional node. This allows for an on demand deployment of routers, switches, gateways, firewalls, load balancers, servers, mobility management entities, and the like. The instantiated function can utilize a set of virtual resources, such as computing, storage and networking resources, rather than requiring hardware resources. As such, VNFs may be instantiated on an as-needed basis using available resources. Typically a VNF is implemented using one or more software components called VNF Components (VNFCs) which are established on NFVI to implement the VNF.

VNF Managers (VNFMs) are VNF management entities responsible for VNF lifecycle management e.g., instantiation, updating, scaling, queries, monitoring, fault diagnosis, healing and termination.

An aspect of the disclosure provides for using NFV to dynamically configure the network topology so that a Distributed Gateway (D-GW) functionality is offered as a VNF. By having a gateway function distributed, it can move along with a UE with respect to the network topology, in order to decrease packet delays. The D-GW can have VNFCs established at NFV-enabled network nodes, for example APs capable of serving a UE. In other words, the Point of Presence (PoP) for the VNFCs can be the nearest APs to the UE. In some embodiments the D-GW comprises one or more VNFCs, each of which acts to provide D-GW functionality on a user or service specific basis.

Due to resource constraints, it is not reasonable to instantiate the D-GW VNF in an active state at every PoP at all times for all UEs. Accordingly, in some embodiments, D-GWs are established on a user or service specific basis. As noted above, it requires a certain amount of non-negligible time from the moment a transmission event is detected to the time the VNF of the distributed gateway is instantiated and transitioned to activated state.

As such, it is desired to have a proactive mechanism that enables D-GW VNFs to be instantiated, configured and in the fully active state, while remaining in a low resource consuming state otherwise.

The present disclosure provides a method and system for management of D-GW VNFCs. The system and method enables the detection of a trigger event and changes the state of a VNF to respond to the event and transitioning the VNF to the VNF state which is able to respond to the trigger. In some situations, this involves the instantiation (scale-out) of a VNFC at a new PoP to serve a UE. This instantiation can be in response to receipt of a transmission directed to the UE, in response to movement of the UE, or in response to a change in capacity of various PoPs to enable more efficient allocation of network resources. In this manner, the VNF can be in a configured and active state in order to enable a transmission when needed.

FIG. 1 illustrates a service management 1 architecture used in 3G and 4G wireless communication networks. In more detail in relation to FIG. 1, the Evolved Packet System (EPS) includes a Radio Access Network (RAN) 100 and an Evolved Packet Core (EPC) 180. RAN 100 performs bearer management, including session management corresponding to the establishment, maintenance and release of bearers. The EPS may further perform connection management, including mobility management corresponding to establishment and security between the network and UEs. The EPS may further perform authentication, such as mutual authentication and handling of security keys.

Further in relation to FIG. 1, the Mobility Management Entity (MME) 151 is configured to create a database 152 including static information, for each powered-on attached UE, such as subscriber information from the Home Subscriber Server (HSS) 155 and UE 110 capability and dynamic information such as a bearer list. The MME 151 tracks the location of the UE 110 and is involved in paging a UE when transmissions addressed to the UE arrive. The HSS manages subscriber database 156, such as Quality of Service (QoS) profiles, access restrictions for roaming, and dynamic subscriber data such as Current MME 151.

The network considers the UE 110 to be in one of several states. The UE is in an idle state (e.g. RRC-IDLE in LTE) when it is on but not actively involved with network transmissions (the UE is known to the EPC, but not known to the eNB and must monitor the paging channel to detect incoming calls). The UE is in a connected state (e.g. RRC-CONNECTED in LTE) when it is actively connected to an eNB (i.e. the UE is known to the eNB and monitors the control channel for scheduling information) 120.

Further in relation to FIG. 1, the Serving Gateway (SGW) 160 acts as a mobility anchor for the UE 110. The SGW 160 buffers Downlink (DL) packets addressed to the UE when the UE 110 is in idle mode. When new data arrives for the UE 110, the SGW 160 buffers the data and sends a request to the MME 151 to page the UE 110. When the UE 110 receives the page, it transitions to a connected state and the packets are forwarded to the serving eNB 120 for transmission to the UE 110. Further, the SGW 160 is configured to maintain a charging log for visiting UEs, and may also perform QoS enforcement.

In the above 3G/4G paradigm, all data routed to a UE 110 in its home network passes through the Packet Data Network Gateway (PGW) 170 from the Internet 180. Data packets are sent from the PGW 170 to the SGW 160 before being forwarded to the eNB 120 to be scheduled for transmission to UE 110.

Because only the S5 bearer is maintained when the UE is in idle mode, the SGW must wait for the S1 bearer to be established before the SGW can forward the packets to the eNB. Accordingly, this idle to connected transition delay adds to the overall packet delay. Packet delay can also increase due to handover operations. There is a need for an improved system for reducing such packet delays, especially for critical communications requiring ultra-low latency (e.g. 1 ms end-to-end delay for command and control MTC applications).

Accordingly, aspects of the disclosure provide systems and methods for establishing one or more D-GW VNFCs located near the location of a wireless device to facilitate faster packet delivery to the wireless device during transitions.

Figure 2:
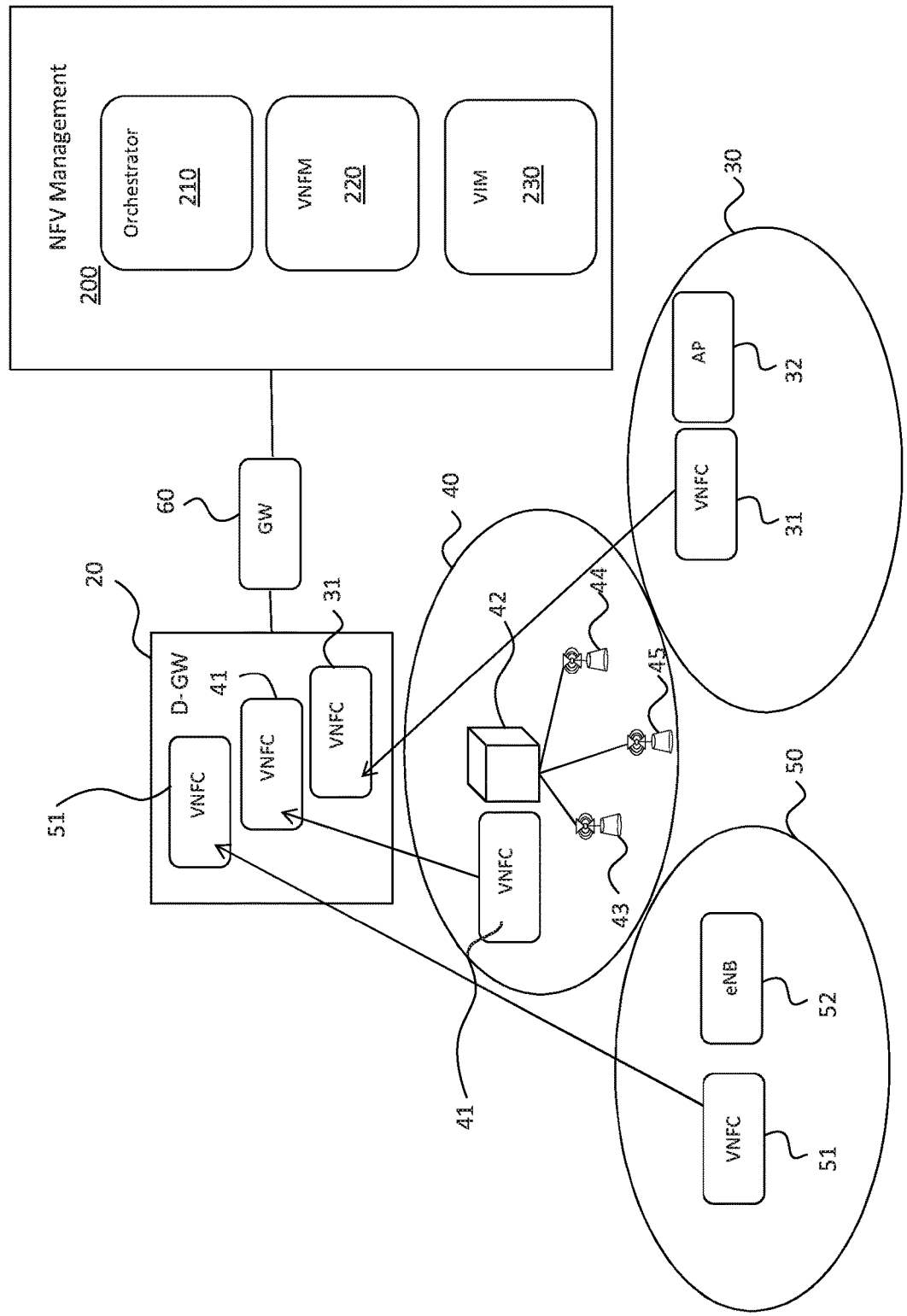
FIG. 2 is a block diagram of a Distributed Gateway according to an embodiment.

FIG. 2 is block diagram of a network architecture using D-GW according to an embodiment. In this disclosure, the D-GW 20 will generally be discussed using examples of a user specific gateway. However, the D-GW can also be service specific, in which case it can serve multiple UEs using the same service. The D-GW VNF itself is composed of several VNFCs. The number of VNFCs and the PoP (location) of the VNFCs depends on such factors as the location and mobility of the UE. In the example illustrated, D-GW 20 is instantiated in three PoPs 30, 40 and 50. PoP 30 includes an AP 32 and a VNFC 31 which is instantiated on NFVI associated with the AP 32. PoP 50 includes eNB 52 and VNFC 51 instantiated on NFVI associated with the eNB 52. PoP 40 is C-RAN architecture PoP which includes Central Processing Point (CPP) 42 and a plurality (in this case three) of separate Remote Radio Heads (RRH) 43, 44 and 45. The CPP includes a Baseband Unit (BBU) which includes a set of VNFs for scheduling and the baseband signal processing functions for implementing the wireless protocol stack. The PoP for the CPP 42 can be a datacenter (DC) or mini-DC. PoP 40 includes VNFC 41 which can be instantiated on the same NFVI as the BBU VNFs. Each D-GW VNFC receives the same DL packets from the Gateway (GW) 60, which can be a PGW, Application Server or a network entry point.

It is noted that the D-GW 20 is shown as a box including three VNFCs, each corresponding to one of the VNFCs in the PoPs. It should be appreciated that this is logical representation, and the GW 60 communicates with each of the VNFCs 31, 41 and 51 directly. Accordingly, each of the VNFCs within logical box 20 has the same numbering as the VNFCs within the PoPs.

FIG. 2 also includes an NFV Management entity 200 which manages the VNFs of the network. It includes a VNFM 220 which is responsible for the lifecycle management of VNFs that it manages. The VIM 230 is a Virtual Infrastructure Manager. The Orchestrator 210 is responsible for the lifecycle management of a network service and instantiates the VNFs using the VIM 230 and the VNFM 220.

Figure 3A:
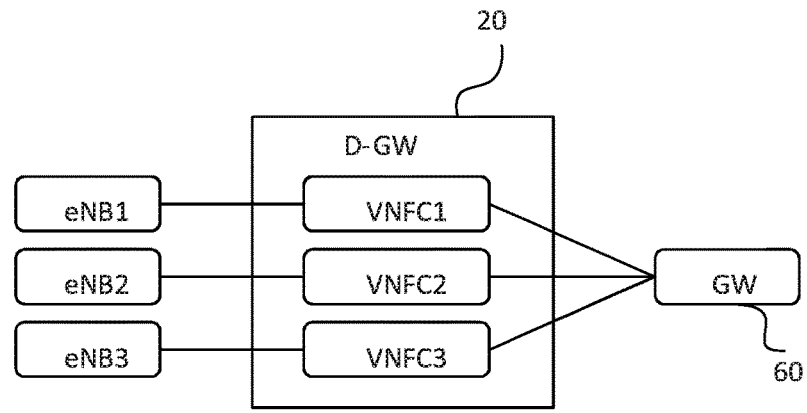
FIG. 3A is a block diagram illustrating Distributed Gateway components according to an embodiment.
Figure 3B:
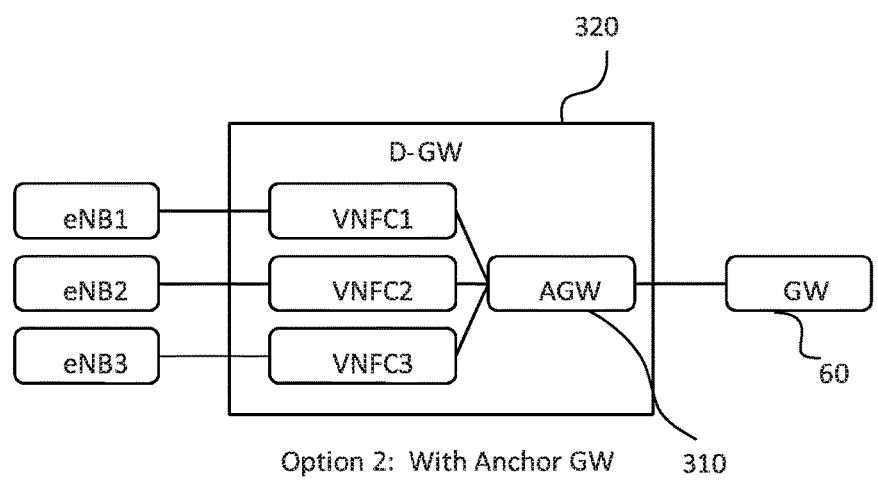
FIG. 3B is a block diagram illustrating distributed gateway components including an Anchor Gateway according to an embodiment.

FIG. 3A is a block diagram illustrating D-GW components according to an embodiment. FIG. 3A is contrasted with FIG. 3B, which is a block diagram illustrating D-GW components including an Anchor Gateway (AGW) function according to an embodiment. In either configuration, each D-GW VNFC has a connection to a different eNB. Accordingly VNFC1 connects to eNB1, VNFC2 connects to eNB2, and VNFC3 connects to eNB3. These connections can be simple internal interfaces if the D-GW VNFCs are instantiated at the same NFVI-PoP as the eNBs. The option without the AGW is used when the UE is always-on and does not transition into idle mode (i.e. the UE remains in a connected mode at all times). The option with the AGW is used when the UE may transition between idle and connected states.

Further, it should be noted that NFV enabled eNBs are shown and discussed throughout this specification as an example of RAN infrastructure. However it should be appreciated that throughout this specification, other RAN infrastructure can be used, such as APs, data centers, C-RAN PoPs with a BBU supporting multiple RRHs, etc.

In a first option, illustrated in FIG. 3A, each of VNFC1-3 in D-GW 20 has a connection to the GW 60 (e.g. PGW or Application Server). In a second option illustrated in FIG. 3B, D-GW 320 includes both VNFC1-3 and an instantiation of AGW 310, which has provides a common connection to the GW 60. The AGW 310 is a packet buffer and forwarder. The Connection Manager (CM) provides the forwarding destination to the SDN-C. The SDN-C provides forwarding rules to the AGW. For DL transmission, the GW 60 forwards the data to AGW 310, where present, or to each of VNFC1-3 in the. Data is buffered by each of the instantiated VNFCs until one of a discard or forward command is received. For uplink (UL) transmission, data is forwarded to the GW 60 from the VNFC associated to the serving eNB either directly or through the AGW 310 where present.

Figure 4A:
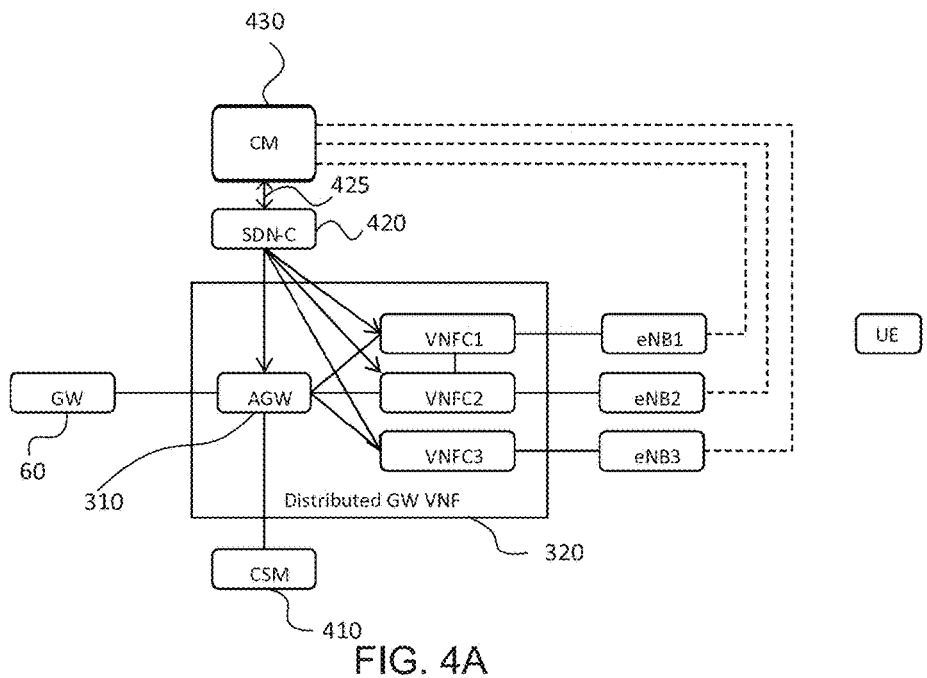
FIG. 4A is a block diagram illustrating distributed gateway components including a Connection Manager and Software Defined Networking Controller according to an embodiment.

FIG. 4A is block diagram illustrating D-GW components and other network components including a CM 430 and a SDN Controller (SDN-C) 420 according to an embodiment. The CM 430 provides the forwarding destination to the SDN-C 420. SDN-C 420 uses the information from the CM 430 to provide the forwarding rules to the SDN-enabled network elements. In an embodiment, SDN-C 420 pre-configures the paths between the AGW 310 and each of the VNFCs. The CM 430 provides the forwarding destination to the AGW 310, which then uses the appropriate pre-configured path to forward the data.

Communication paths from the SDN-C 420 to each of the VNFCs (VNFC1, VNFC2 and VNFC3) enable the SDN-C to provide different instructions to each of the VNFCs. ACM VNF 430 can be connected to the SDN-C on the northbound interface 425. The CM replaces the MME and tracks the location of the UE. The northbound interface is used to represent communication between a controller (in this case the SDN-C 420) and applications or higher layer control programs (in this case the CM 430). The CM 430 is shown to have signaling links with the APs (e.g., eNB1, eNB2 and eNB3) for UE location tracking and paging. A Customer Service Manager (CSM) 410 can be connected to the AGW 310 to keep track of the resource usage for charging.

The CM 430 can be a user specific VNF, or it can be a shared resource which supports multiple D-GWs for communication with multiple UEs. Alternatively, it can be a common function that can also serve other UEs that are not connected to a D-GW. Each of VNFC1-3 receives and buffers packets from GW 60. As noted above, GW 60 may be an AS. The SDN-C 420 uses the location information sent from the CM 430 to decide which VNFC will forward the DL packets to the UE. For example, if VNFC3 is selected by the SDN-C 420 to serve the UE, then VNFC3 will be instructed by the SDN-C to forward the packets. VNFC1 and VNFC2 can then be instructed by SDN-C 420 to discard the packets. This is illustrated in more detail in FIG. 5.

Figure 4B:
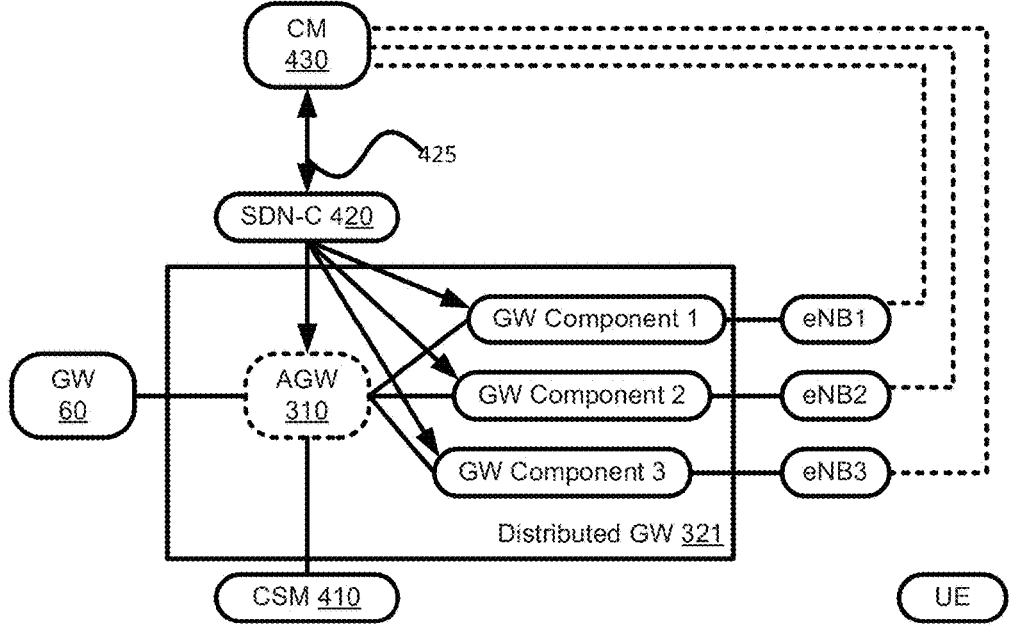
FIG. 4B is a block diagram illustrating a distributed gateway in communication with a connection manager and an SDN-C, composed of non-virtualized GW components.

FIG. 4B is an illustration of an alternate embodiment of a Distributed GW 321. Those skilled in the art will appreciate that the above discussion of a distributed gateway has been framed in the context of using virtual network functions. It should be understood that in many network designs the use of a virtualized network function is an efficient use of resources as it does not require the deployment of dedicated network functions at a plurality of different locations. However, the methods and systems of the present invention can also be used in networks in which dedicated or physical network functions are deployed instead of a reliance on virtual functions. As an example, in a network, non-virtualized gateway functions can be distributed throughout the network, for example, they can be co-located with the Access Points/eNodeBs. These gateways can be configured to serve a plurality of different UEs, and due to their co-location with an eNodeB, the round trip time or latency for communications is reduced. The non-virtual GW can serve as a GW Component analogous to the VNFC. Where a VNFC is can be instantiated, configured and activated, an NFC-based GW does not need to be instantiated as it already exists. However, in place of instantiation, and initialization instruction can be transmitted to associate the GW with the DGW 321. Configuration and activation of the GW can be performed with minor changes to the processes described herein as will be appreciated by those skilled in the art. The use of physical network functions may be more frequently used for commonly or heavily used functions, while functions that are used more rarely may be virtualized. Those skilled in the art will appreciate that through the other figures, requests for the instantiation of a virtual function, could be replaced by requests for the initialization or initiation of a physical function, and reference to a virtual network function or virtual network function component can be understood to also be applicable to any type of network function of network function component.

As can be seen in FIG. 4B, the D-GW 321 can optionally include an AGW 310. The GW 60 communicated with the GW components 12 and 3 (either directly or through the AGW 310. The SDN-C 420 can transmit instructions to each of the GW components, much as it does with the VFNCs in FIG. 4A. As noted above, some changes in the messages (e.g. instantiation commands being replaced with initialization commands) transmitted will occur, but will be understood by those skilled in the art.

Figure 5:
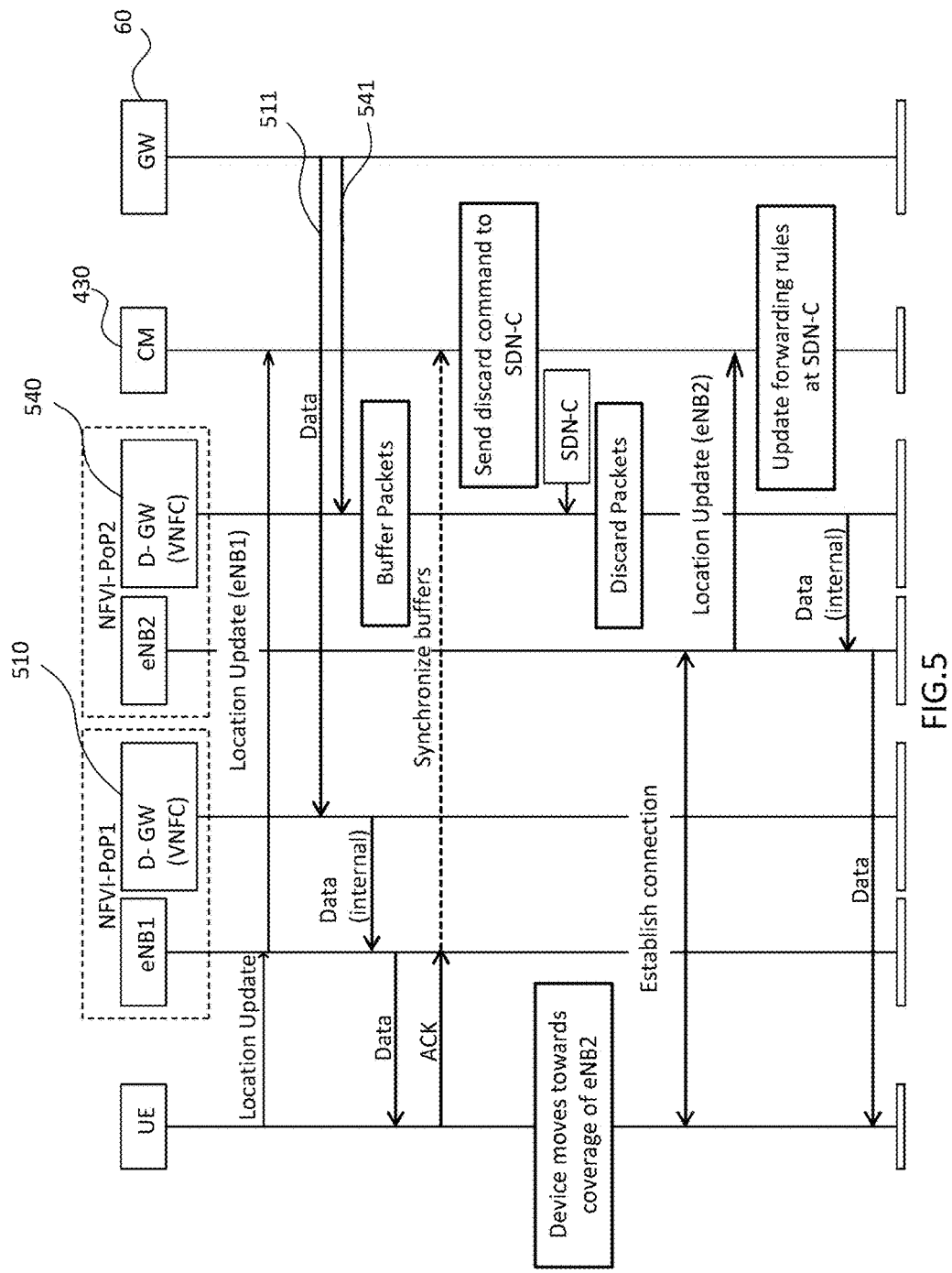
FIG. 5 is a message flow diagram according to an embodiment.

FIG. 5 is an example message flow diagram for a DL transmission to a UE according to an embodiment. In this example, the D-GW is instantiated on two PoPs which contain transmit points that can potentially transmit to the UE. NFVI PoP 1 includes eNB1 and VNFC 510, whereas NFVI PoP 2 includes eNB2 and VNFC 540. The eNBs/APs, located at the PoPs where the VNFCs are instantiated, can be used to form the tracking area for the UE when the UE is in idle mode. When the UE is in connected mode, the eNBs/APs form a serving cluster.

In response to receiving a location update message from the UE, eNB1 sends a location update to the CM. When data arrives at GW 60, the packets are forwarded to both VNFC 510 VNFC 540 as shown in flows 511 and 541 respectively. VNFC 510 forwards the packets to eNB1 via internal bus if both the eNB and VNFC reside in the same NFVI-PoP, for scheduling and transmission to the UE. As shown, both D-GW VNFC 510 and eNB1 reside within NFVI-PoP1 so the internal bus transfer can be used. VNFC 540 buffers the packets until a discard or forward command is received from the SDN-C. As the UE moves towards the coverage area of eNB2, a connection is established with eNB2, resulting in a location update message to the CM 430. The forwarding rules are updated at the SDN-C such that subsequent packets are transmitted from eNB2 and discarded at VNFC 510.

It should be appreciated that the above example does not include an AGW. An embodiment utilizing an AGW applies the following steps when a new packet arrives for the UE at the GW (assuming the UE is in idle mode and the VNFCs are instantiated by not active). The packet is forwarded to the D-GW VNF (AGW VNFCs). The AGW activates (through the VNFM) the VNFCs and forwards the packet to each VNFC. The AGW sends a request to the CM to page the UE. The CM receives the location of the UE from the paging response and reports the location to the AGW. The AGW instructs the corresponding VNFCs to either forward the packet to its associated eNB, or to buffer the packet until a discard command is received. The forwarding rules are updated as the UE moves. The discard command can be sent after each packet is transmitted or it can be sent less frequently. However, the buffers should be periodically synchronized to avoid sending duplicate packets to the UE unnecessarily.

Either with or without an the AGW, data packets are sent to both the VNFC 510 and VNFC 540 at the same time, and both VNFCs buffer the received packets. The CM notifies each AP if it is to transmit, and can similarly notify an AP if it is to discard its queued data. When the UE moves from the area served by PoP1 to the area served by PoP2, at a transition point the CM updates the forwarding rules such that the AP located at PoP2 starts to transmit and the AP at PoP1 discards the packets. Because the VNFCs are instantiated, configured and active before the UE is connected to them, they can buffer packets for transmission allowing for a reduction in the packet delay while the UE moves. Those skilled in the art will appreciate that in an embodiment which does not use virtualized functions, the VNFCs 510 and 540 would be replaced with GW NFCs, which could be resident within the same PoP as the eNB. The GW NFC would not need to be instantiated, but could otherwise function as illustrated in FIG. 5.

Figure 6:
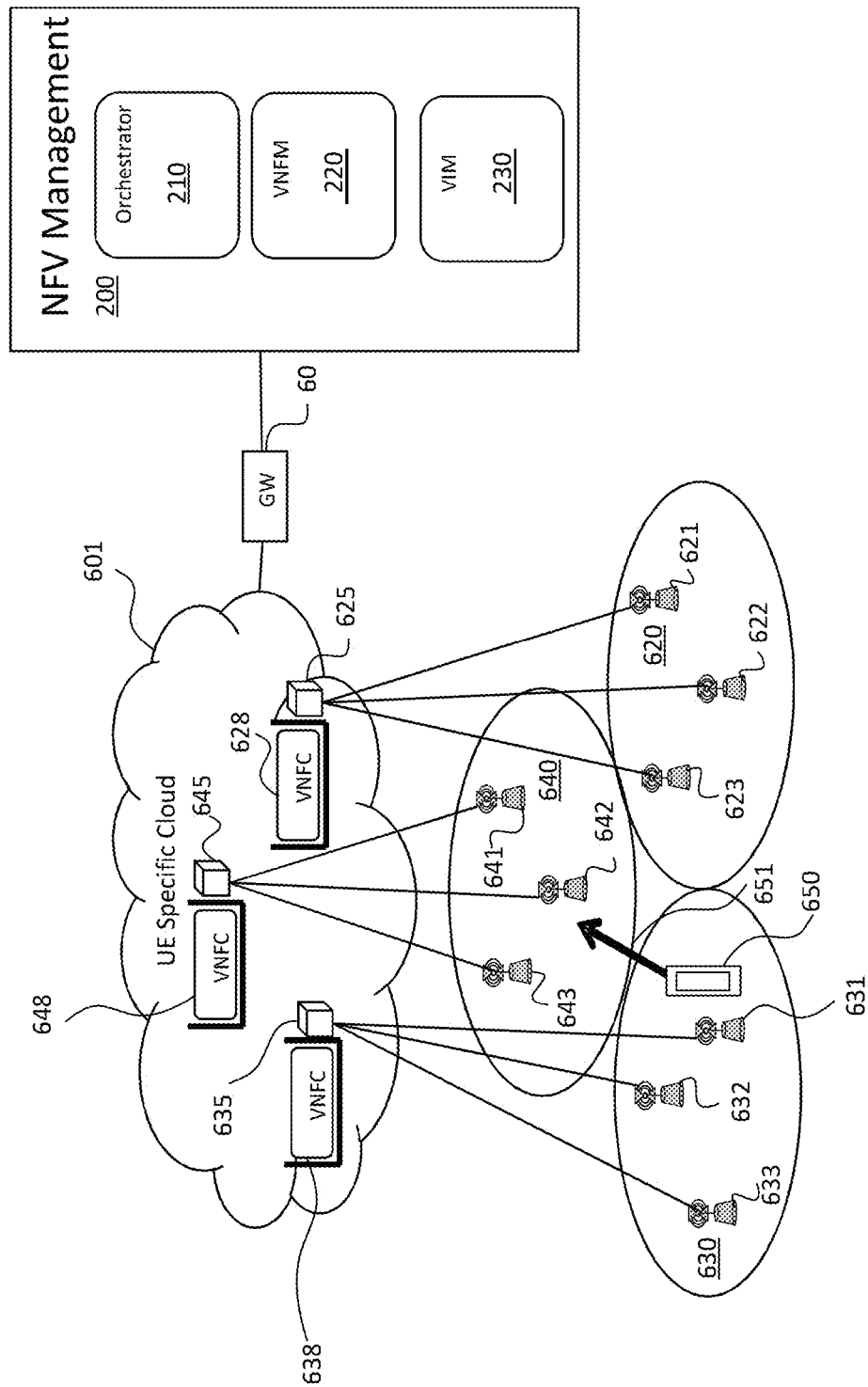
FIG. 6 is a block diagram of a Distributed Gateway cloud arrangement according to an embodiment.

FIG. 6 is block diagram of a D-GW cloud arrangement according to an embodiment. In this example, a UE-specific cloud 601 is schematically illustrated to include CPP 625 hosting VNFC 628 which is connected to three associated RRHs 621, 622, 623 which form serving cluster 620. CPP 635 is shown as hosting VNFC 638 which is connected to three associated RRHs 631, 632, 633 forming serving cluster 630. CPP 645 is shown as hosting VNFC 648 which is connected to three associated RRHs 641, 642, 643 forming serving cluster 640. Each component within UE-specific cloud 601 is communicatively coupled to GW 60 and to other network elements such as an SDN-C and NFV management entities (not shown). FIG. 6 illustrates a virtual user-specific cloud that has active elements that follow a mobile UE as it moves. In this case, as the UE moves across the network, VNFCs can be instantiated in places where the UE might move to next and other VNFCs can be terminated. Accordingly, as UE 650 moves in direction 651, a transition from cluster 630 to cluster 640 occurs. In addition to this handover, VNFCs for clusters which are now further away may be terminated (i.e., dropped from cloud 601), whereas VNFCs for clusters in closer proximity to the UE's expected position can be instantiated (i.e., added to cloud 601). As nodes instantiated nodes are made active, formerly active nodes are put into an inactive state, new nodes are instantiated and instantiated nodes are torn down, it appears as if the UE specific cloud is moving with the UE.

Figure 7:
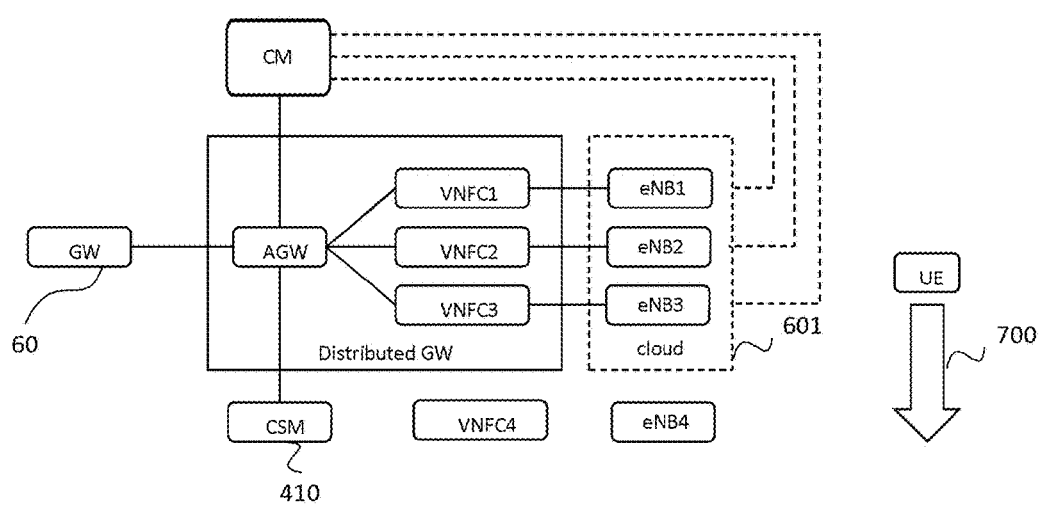
FIG. 7 is a block diagram of a Distributed Gateway illustrating the expansion to include an additional component as a UE moves according to an embodiment.

FIG. 7 is a block diagram of a D-GW illustrating the expansion to include an additional component as a UE moves according to an embodiment. As the UE moves across the network, it will come into the serving range of some nodes and leave the serving range of other nodes. Accordingly, nodes can be added to the cloud 601 in locations that the UE is likely to move to, while locations that the UE is not likely to move to (or move back to) can have their nodes removed. The use of a mobility prediction function can identify that as a UE moves in a given direction, it is unlikely that the UE will go to a non-adjacent location that would require turning around. Even if this activity were to happen, there would be sufficient advance notice to instantiate the infrastructure before the UE reached these locations. As such, it is an efficient use of resources to tear down the virtual infrastructure that the UE will not use. These changes to the serving cloud 601 can be thought of as moving a tracking area of APs which can potentially serve the UE. When a new node is added to the serving cloud 601, the D-GW can be scaled out to include an instance at the NVFI-PoP that is hosting the new node. For nodes that are dropped from the serving cloud, the corresponding VNFC from the D-GW is terminated and the D-GW is effectively scaled in. Accordingly, as the UE in FIG. 7 moves in the direction of arrow 700, it moves away from eNB1 and towards eNB4. Accordingly, VNFC4, which did not previously exist (or as discussed below, was in a null state), is established to allow eNB4 to serve the UE as it moves in range. This is called a scale-out operation. Once instantiated, VFNC4 forms part of the D-GW. As the UE moves out of range of eNB1, VNFC1 is terminated and removed from the D-GW. This is called a scale-in operation. Once again, the D-GW (which can be thought of as a cloud of VNFCs) moves with the UE. It is noted that an SDN Controller (SDN-C) is not shown in FIG. 7, but it should be appreciated that embodiments can include an SDN-C. In an alternate embodiment, the VNFCs can be replaced with NFCs, as illustrated in FIG. 4B.

Figure 8:
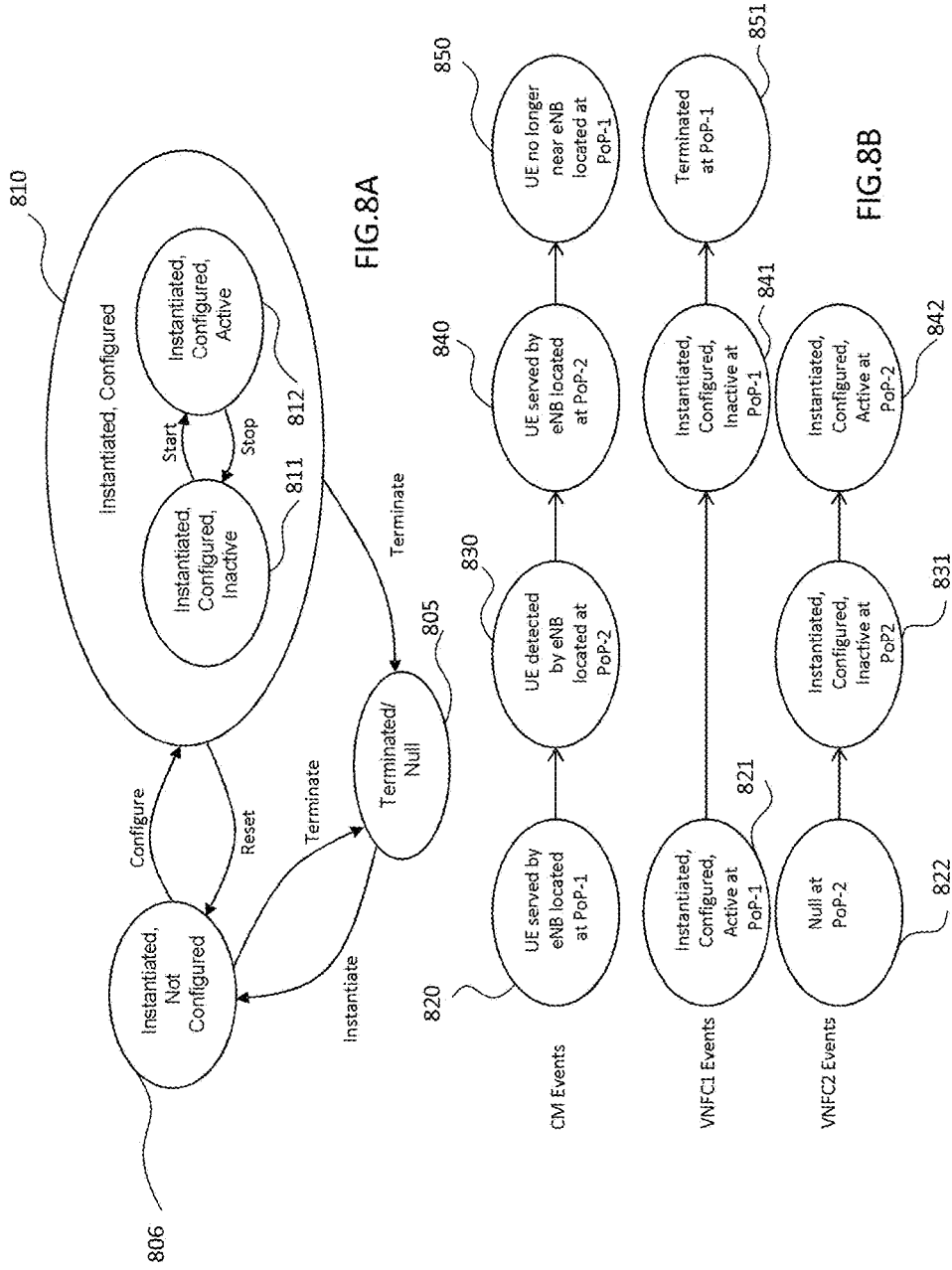
FIG. 8A schematically illustrates generic virtual network function component states.
FIG. 8B schematically illustrates virtual network function component states according to an embodiment.

A Network function, such as a physical network function or a VNF, can have multiple states and can be transitioned from one state to another over its lifecycle. The following discussion will be framed with respect to virtualized entities, but should be understood to also apply to physical network functions. To transition the VNF between different lifecycle states, a VNFM can be used. The VNF states and the state transition triggers are illustrated in FIG. 8A, which schematically illustrates generic virtual network component states. It should be noted that not every instantiation will experience all the states as it is possible for a function to be instantiated and never activated prior to tear down.

Once on-boarded to a VNF Catalog associated to the PoP, the VNF will be in Null State 805, ready to be instantiated in response to an instantiate command issued from the VNFM. An instantiated VNF can be in one of the following states: Not Configured 806 or Configured 810. An Instantiated-Configured VNFC 810 can be Configured-Inactive 811 or Configured-Active (I:CA) 812. Each VNF state corresponds to a different amount of NFV infrastructure (NFVI) resource usage. The VNFM controls the state by issuing Instantiate, Configure, Start, Stop, Reset and Terminate commands. Furthermore, the transition from one state to another state may require different configuration time durations.

FIG. 8B schematically illustrates virtual network component states and examples of events which trigger a change in state, according to an embodiment. In this example, it is assumed that the UE is initially served by eNB located at PoP-1 which is controlled by VNFC1 820. Accordingly, VNFC1 is Instantiated-Configured-Active at PoP1 as shown at 821. The UE is out of range of eNB at PoP2, accordingly VNFC2 is in a null state at PoP2, as shown at 822. The UE moving within range to be detected by eNB located at PoP2 is a triggering event 830 which causes the VNFM to change the state of VNFC2, as shown at 831, to Instantiated-Configured-Inactive at PoP2. VNFC2 is now in a state where it can be quickly transitioned to the active state once the CM decides that PoP2 should serve the UE, as it does at 840. Accordingly, VNFC1 transitions to Instantiated-Configured-Inactive at PoP1 at 841, whereas VNFC2 transitions to Instantiated-Configured-Active at PoP2 as shown at 842. By having VNFC2 already instantiated and configured, this allows for a quicker handover with less packet delay than for conventional systems. If the UE continues to move away at 850 such that the UE is no longer near eNB located at PoP1, the CM instructs the VNFM to terminate the VNFC1 at PoP1, as shown at 851.

Figure 9:
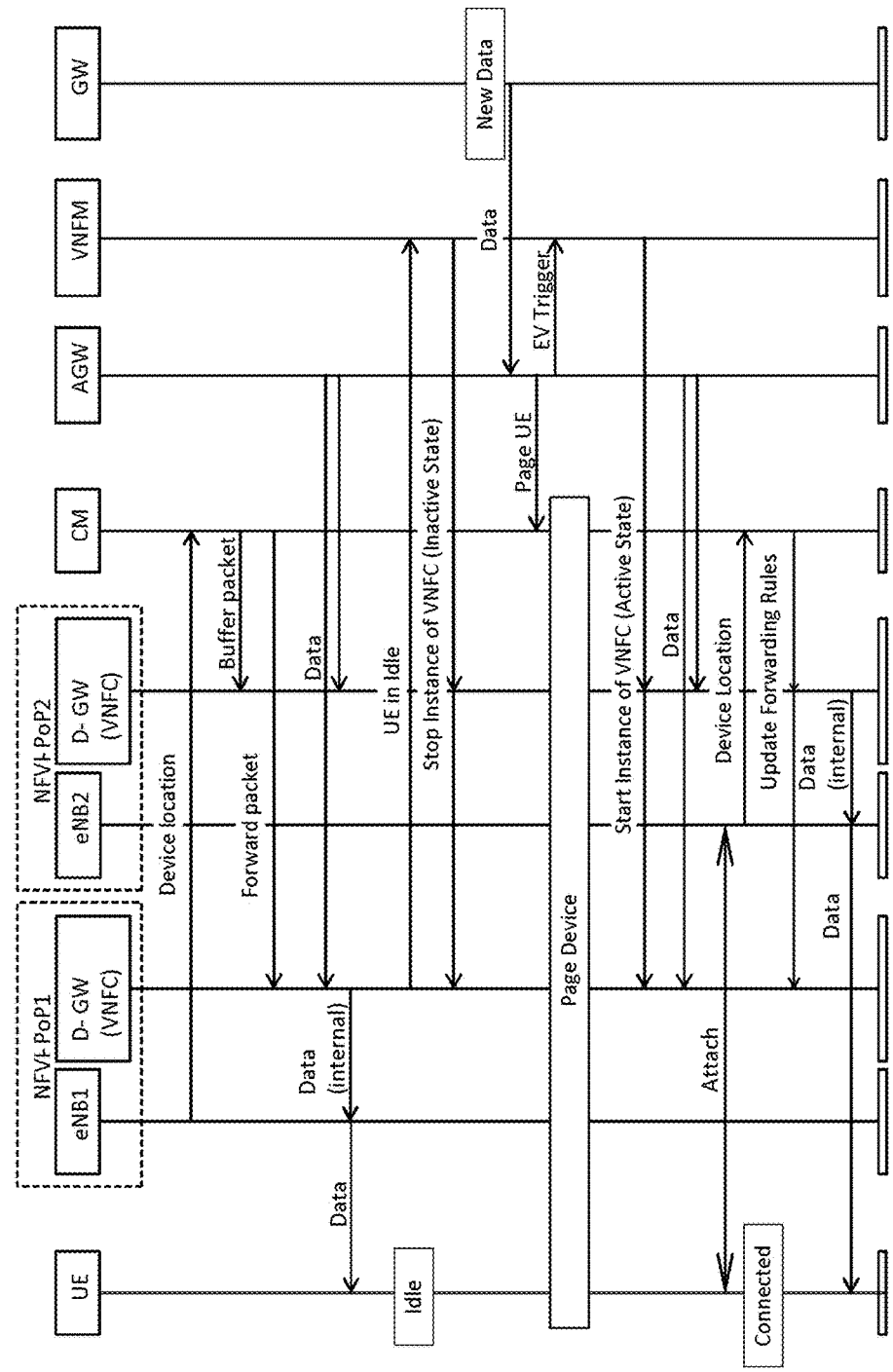
FIG. 9 is a message flow diagram illustrating a transition of a UE from idle to connected according to an embodiment.

FIG. 9 is a message flow diagram illustrating a transition of a UE from idle to connected according to an embodiment. As discussed above, based on receiving a transmission from a device, the eNB1 sends device location information to the CM. In response to the location information, the CM instructed the D-GW in NFVI-PoP2 to buffer packets addressed to the UE, and instructs the D-GW in NFVI-PoP1 to forward packets addressed to the UE. Data received at the AGW is forwarded to both D-GWs. The data is buffered at the D-GW in NFVI-PoP2, and is forwarded (over an internal connection) to eNB1 from the D-GW in NFVI-PoP1. eNB1 then transmits the data to the UE. After some time interval, the UE enters an IDLE state. In response to the UE entering an IDLE state, the VNFM changes the state of the VNFCs to an Inactive state, which may be done by issuing a STOP command. When New Data addressed to the UE arrives at the GW, the GW forwards the data to the AGW. The AGW requests a UE paging from the CM, and sends an EV trigger message to the VNFM. The EV trigger message is received by the VNFM, which in turn initiates a change in state for the D-GW VNFCs at the PoPs. This change in state can be accomplished through the use of a Start command to the VNFCs which causes them to transition to the Active state. In another embodiment, upon receiving the page request, the CM could send the Event (EV) trigger to the D-GWs. When the D-GW VNFCs are in an active state, the data addressed to the UE can be sent to both of them for buffering. At this point both D-GWs will buffer the data because to the system, it is unclear which of the D-GW instances will be serving the UE. In response to the paging of the device, the UE will attach to an eNB. In this example, the UE connects to eNB2, which then sends Device Location data associated with the UE to the CM. Based on the device location data, the CM determines that eNB2 should serve the UE and transmits updated forwarding rules to both D-GWs. In response to the forwarding rules, eNB2 receives the data from its associated D-GW element and forwards the data to the UE. In other embodiments the paging of the UE and the activation of the D-GWs can be done sequentially (in either order) or in parallel. This is true of many steps that can be re-ordered or done in parallel. In an embodiment employing physical NFs, the transmission of an instruction to stop an instance, could be replaced by a command that would release the physical component resources reserved for the overall distributed GW. An instruction to start an instance would be replaced by a command to initialize the GW NFC allocated to the overall D-GW.

Figure 10:
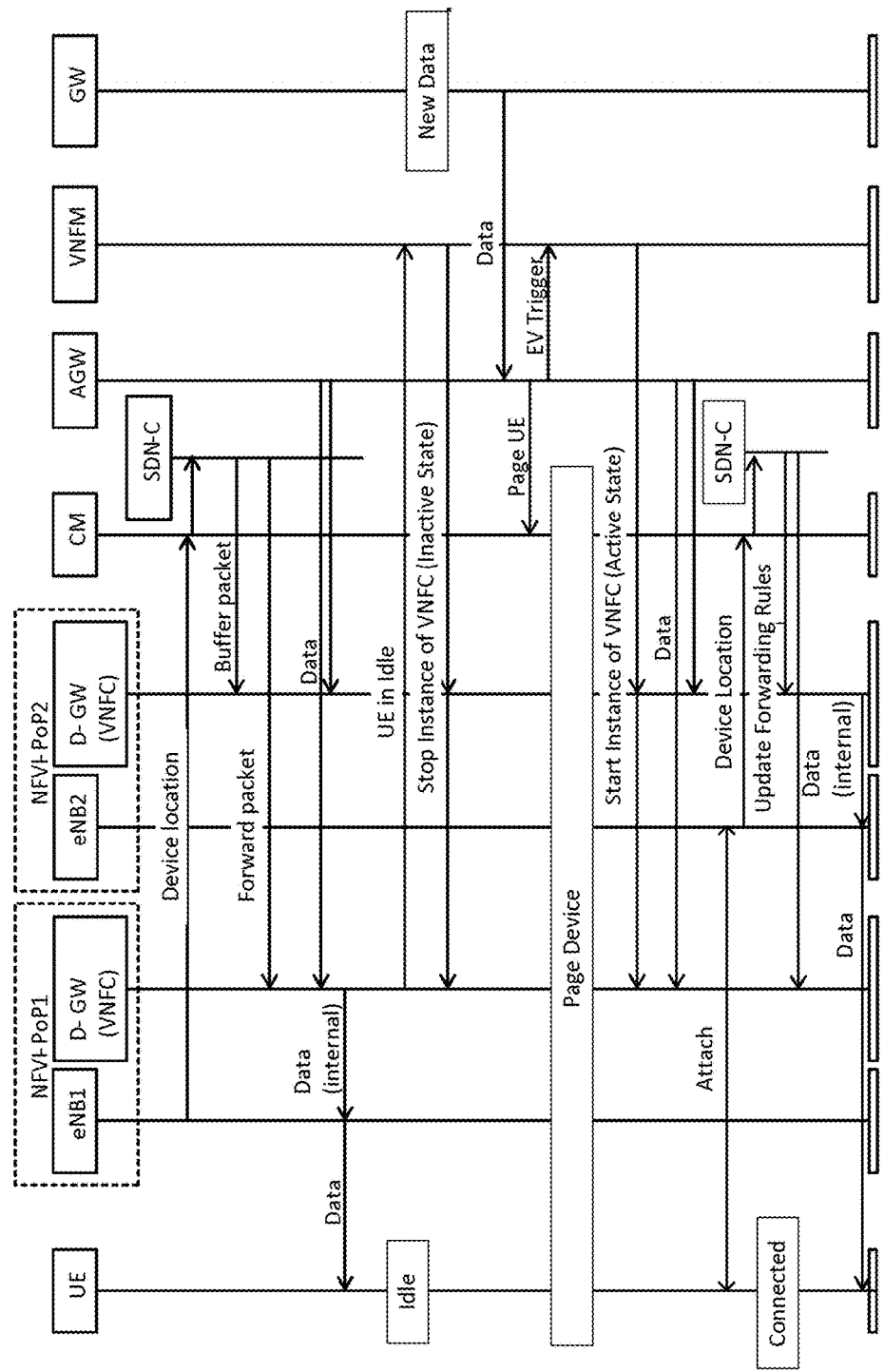
FIG. 10 is a message flow diagram illustrating a transition of a UE from idle to connected utilizing a Software Defining Network Controller according to an embodiment.

FIG. 10 is a message flow diagram similar to that of FIG. 9. Unlike the method of FIG. 9, in FIG. 10, the device location is provided to an SDN controller (SDN-C). The SDN-C is relied upon to determine the forwarding rules and decision on when D-GWs should flush their buffers. Although it is shown that the SDN-C sends messages directly to the instantiations of the D-GW, in an alternate embodiment, the forwarding rule decisions could be made by the SDN-C and forwarded to another entity, such as the CM, for propagation.

The term "scale-out" refers to instantiating an instance of a virtual function at a new node. In its application to the current discussion about a distributed gateway, it can refer to the instantiation of a VNFC at another PoP. Such an instantiation effectively results in an expansion of the D-GW to a new location. Instantiating a new VNF/VFNC is an example of a scale-out operation, whereas terminating a VNF/VNFC is an example of a scale-in operation. Both are operations that can be used in a migration.

Figure 11A:
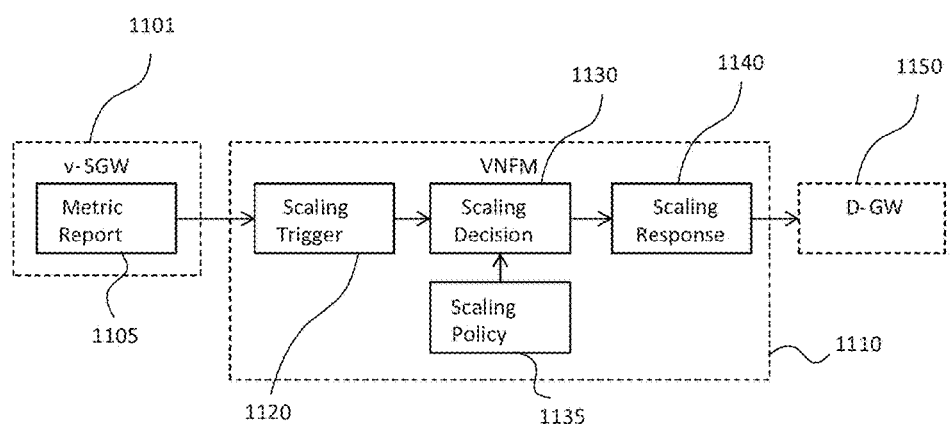
FIG. 11A is a flowchart illustrating scaling according to an embodiment

FIG. 11A is a block diagram that includes flows that help to explain the scaling of a v-SGW to a D-GW according to an embodiment. Scaling can include a scale-out (e.g., the instantiation of a new VNF/VNFC) or a scale-in (the termination of a VNF/VNFC). Although the following discussion focuses on a scale-out operation, similar operations are followed in a scale in operation. The VNFM 1110 associated with the v-SGW function 1101 is composed of several functions: Scaling Trigger 1120, Scaling Decision 1130, Scaling Response 1140 and Scaling Policy 1135. The D-GW can be user specific or it can be service specific. A user specific D-GW serves a single UE, where a service specific D-GW can serve all devices that are associated with a single service. The v-SGW function 1101 supports a large number of users, who may be spread over a larger geographic area. The metric report 1105 from the v-SGW 1101 is sent to the Scaling Trigger function 1120. If the Scale-Out criteria are satisfied, then a trigger message is sent to the Scaling Decision function 1130. The Scaling Decision function 1130 determines whether a Scale-Out to a D-GW should be initiated in accordance with parameters that are defined by Scaling Policy function 1135. This decision is sent to the Scaling Response function 1140, which generates the command to scale-out to a new VNF with the flavor ID for the D-GW VNF.

FIG. 11 illustrates some options for establishing a new D-GW or adding a VNFC to an existing D-GW. The Virtual SGW (v-SGW) 1101 can be an instance of a common GW function that serves a large number of users. The D-GW can be considered as another flavor of either the v-SGW VNF or a GW VNF. In this case, during the lifecycle management of the v-SGW VNF, the VNFM can instantiate a new instance of a D-GW VNF. For example, an auto-scaling policy for the v-SGW VNF can be defined to instantiate a user specific D-GW (or a service specific VNF that serves a group of UEs).

The lifecycle management for the D-GW can be performed by the VNFM 1110 of the v-SGW 1101. The v-SGW VNF 1101 or a Virtual GW (v-GW) VNF can send Metric Report 1105 to the VNFM. Metric Report 1105 is a measurement report which provides feedback in terms of performance metrics. It can be used to update Scaling Policy 1135, based on network conditions, capacity, Service Level Agreements (SLAs) etc. A Scaling Trigger 1120 decision is made by VNFM 1110 based on some trigger input, for example, receipt of a message indicating the appearance of a UE (e.g., a UE powers on, or moves into the serving area). Triggers can be sent to the VNFM from the CM.

The VNFM then makes a Scaling Decision 1130, based on the Scaling Policy 1135, deciding whether or not to make a Scaling Response 1140 to add a new VNFC. The auto-scaling policy for the D-GW can be defined based on factors including the UE's location and mobility. For example, the Scaling Policy 1135 can be defined as criteria parameter or action type, wherein the scaling criteria can be defined based on some UE condition/status exceeding a threshold. One example can be to only instantiate a new VNFC if the channel condition is above some threshold. The Scaling Decision 1130 can be, for example, to scale-out with flavor=flavor ID. Flavor ID is a parameter in the VNF Descriptor, which contains parameters and information elements associated with the VNF. It allows for multiple definitions for a class of VNFs. For example, a common GW VNF that is used to serve a large number of UEs has a flavor ID that is different than a user specific (or service specific) D-GW VNF. The scale out function can be extended to allow the scale out to a different flavor ID.

When the Scaling Decision is to instantiate a new D-GW VNF, the Scaling Response 1140 implements the decision by instantiating the new D-GW. In some embodiments, the Scaling Decision 1130 and Scaling Response 1140 can be merged into one function because they belong to the same entity. The Scaling Decision is the decision to Scale-Out. The Scaling Response is the actual command to Scale-Out the VNF; e.g., the command to instantiate a new VNFC, which can be sent to the VIM 230, Orchestrator 210, or both for implementation. In one embodiment the, D-GW can be instantiated during the instantiation of a network service without the need to scale out from a common GW function.

Figure 11B:
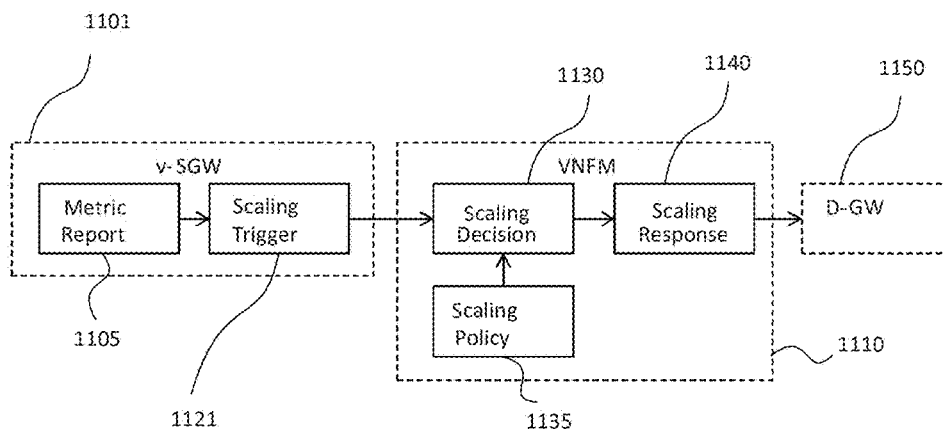
FIG. 11B is a flowchart illustrating scaling according to another embodiment.

FIG. 11B is a flowchart illustrating details according to a second scale-out option for the instantiation of a D-GW according to an embodiment. FIG. 11B differs primarily from the embodiment illustrated in FIG. 11A by the location of the Scaling Trigger. In FIG. 11A, the scaling trigger 1120 was a part of the VNFM 1110. In FIG. 11B, the v-SGW 1101 includes the Scaling Trigger 1121 (which again may be based on a trigger event message received from the CM). In this case, the v-SGW VNF can send a Scale-Out (with Flavor ID) message to the VNFM. The VNFM 1110 then makes the Scaling Decision by checking the Scaling Policy and, if appropriate, instantiates the D-GW VNFC.

Scaling operations can include, for example, a scale-out from a common GW VNF (e.g. v-SGW) to a D-GW. The scaling operation can also be used to migrate the D-GW to track the UE. Migration also includes Scale-In operations, in which a PoP is removed from a D-GW (for example, if the UE moves out of range). UE mobility may include a migration of the D-GW VNFCs. Other Migration operations can include Scale-Up and Scale-Down operations where network resources allocated to a VNFC are increased or decreased respectively. These include changing the state of the VNFC, for example from Instantiated-Not Configured, to Instantiated-Configured. Further Migration does not necessarily include a one-to-one correspondence between a Scale-Out and a Scale-In Operation. For example, two VNFCs can be instantiated as it may not be clear which will best serve a moving UE. The UE may be handed off to one of them, but the system may or may not Scale-In both the old VNFC (which was originally serving the UE) and the VNFC which was instantiated but not selected to serve the UE. Further, a Migration event may occur to better optimize network resource allocation, rather than in response to UE movement. For example, if a UE could be served by APs at more than one PoP, it may be migrated to one with excess capacity to free up resources at a constrained PoP.

Figure 12:
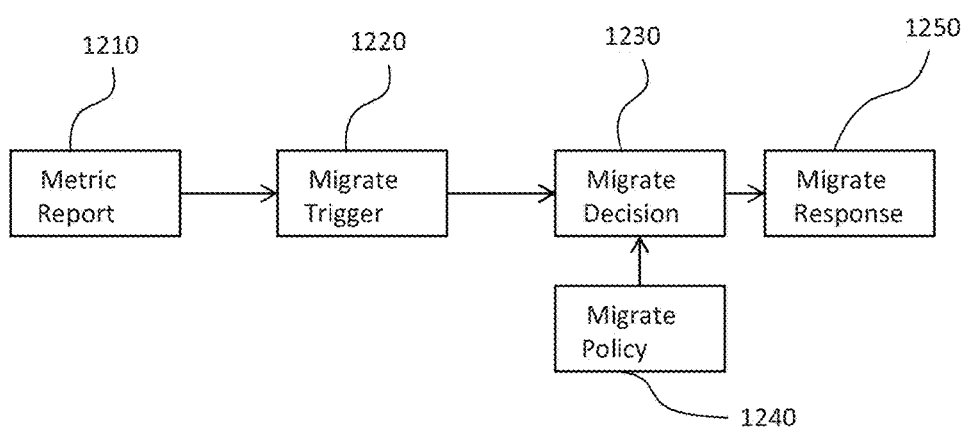
FIG. 12 is a flowchart generally illustrating migration according to an embodiment.

FIG. 12 illustrates the migration of one or more D-GW components according to an embodiment. In operation, analysis of the existing nodes, traffic between them, and other information such as the location of the nodes with respect to the traffic can be gathered together into a metric report 1210. The metric report 1210 may be generated by a single node acting as an aggregation point, or it could take the form of a series of metric reports. When the factors reported in metric report 1210 exceed a threshold, a migrate trigger message 1220 is issued. A determination of whether a migration of a VNF should occur is made on the basis of the migrate trigger message 1220 (and optionally any information from the metric report 1210 that was relevant to the trigger), along with decision factors defined in migrate policy 1240. Taken together, the trigger conditions 1220 and the migrate policy 1240 are used to determine the migrate decision 1230. The result of the decision 1230 is typically to either maintain the exiting deployment, perform a scale out, a scale in, a scale up or a scale down. These responses form the Migrate response 1250. The Migrate Decision 1230 is the decision to migrate. The Migrate Response 1250 can be the actual command to migrate the VNF, which can be sent to the VIM 230, Orchestrator 210, or both for implementation.

Figure 13A:
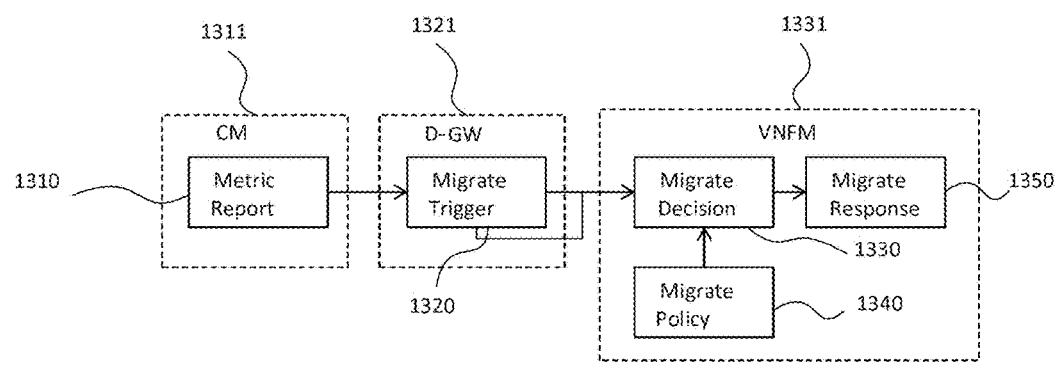
FIG. 13A is a flowchart illustrating one option for the migration of a Distributed Gateway component according to an embodiment.
Figure 13B:
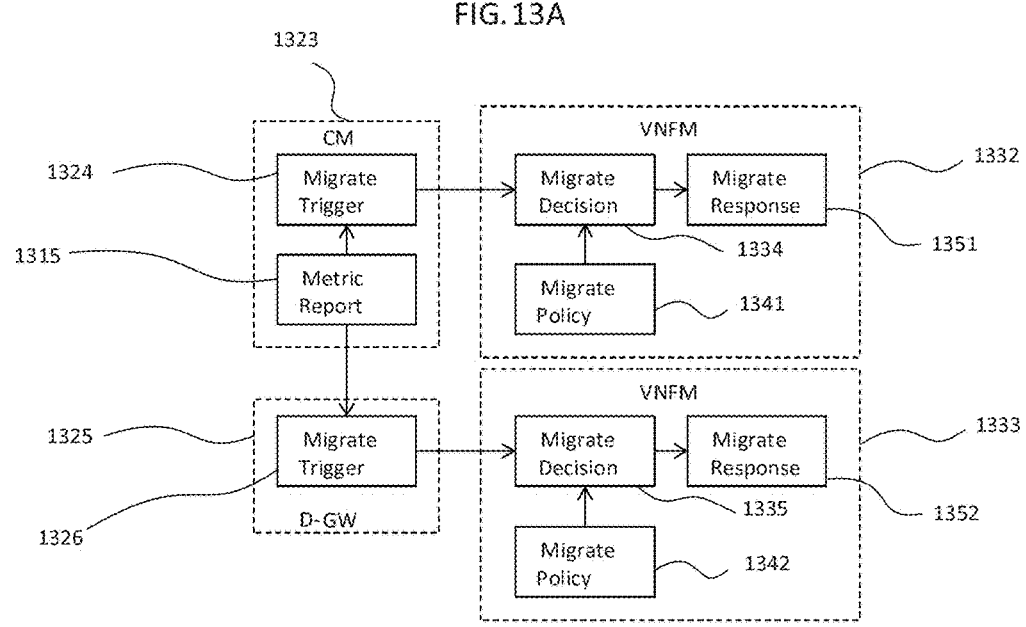
FIG. 13B is a flowchart illustrating a second option for the migration of a Distributed Gateway component according to an embodiment.
Figure 13C:
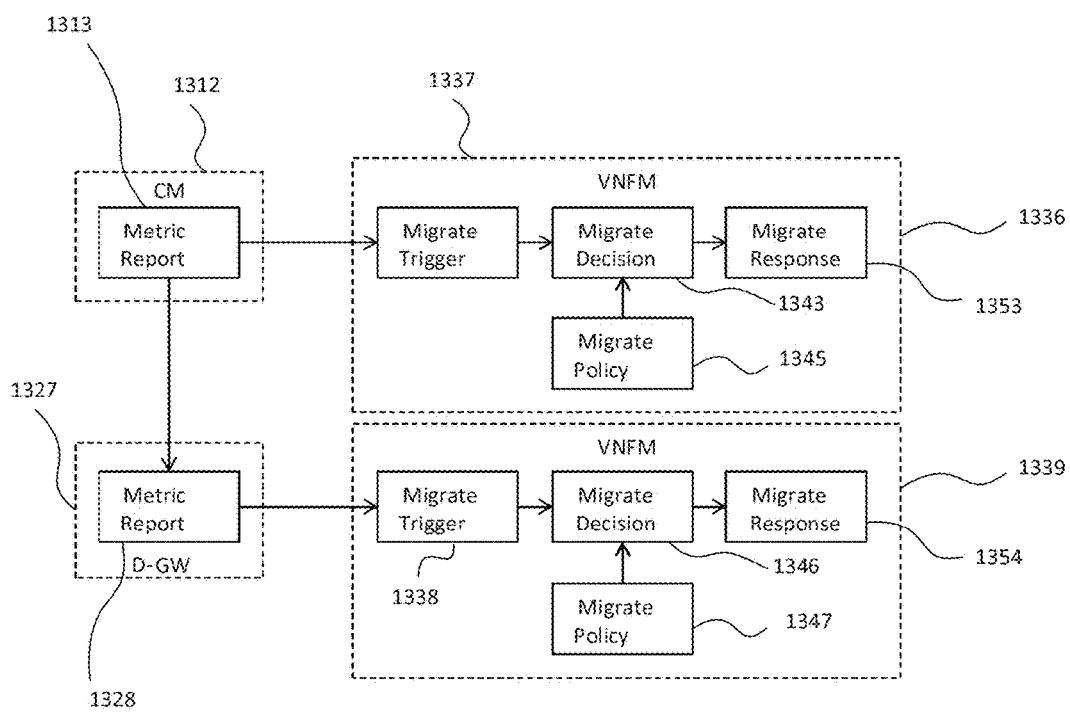
FIG. 13C is a flowchart illustrating a third option for the migration of a Distributed Gateway component according to an embodiment.

There are several system variations for implementing such a process, for which three example embodiments are illustrated in FIG. 13A, FIG. 13B and FIG. 13C. It should be understood that the following examples use virtualization specific language for the purposes of illustration and should not be considered to be limiting the applicability to just virtualized environments.

FIG. 13A is a flowchart illustrating a first option for the migration of one or more D-GW components according to an embodiment. In this embodiment, Metric Report 1310 is generated by the CM 1311 which provides it to D-GW component 1321 which provides a Migrate Trigger 1320 to the VNFM 1331. The VNFM 1331, upon receiving Migrate Trigger 1320, makes Migrate Decision 1330 based on Migrate Policy 1340 and the migrate trigger 1320. The VNFM 1331 also initiates Migrate Response 1350 based on Migrate Decision 1330. Such a system allows for one function triggering the migration of another function. Further, the metric report 1310 and the Migrate Trigger 1320 can be generated in different VNFs (or in the element manager (EM) of a VNF). The Migrate Decision, Migrate Policy and Migrate Response can be in the VNFM. In this example, the two VNFs (namely the CM 1311 and D-GW 1321) can have the same VNFM. By distributing the steps across different entities, a great deal of customization can occur. A single type of metric report 1310 can be generated by a CM1311. The determination of whether a migration trigger 1320 is generated can be based on different factors in differently instantiated D-GWs. Similarly, different VNFMs can have different sets of migration policies which will result in different decisions to the same migration trigger 1320.

In a second embodiment, the VNFs can have different VNFMs, an example of which is illustrated in FIG. 13B. FIG. 13B is a flowchart illustrating a second option for the migration of one or more D-GW components according to an embodiment. In this example, Metric Report 1315 from one VNF can be used to trigger a VNF migration of the VNF itself and another VNF independently. Both VNFs will be migrated at the same time if they have the same Migrate Policy. The Migrate Trigger can be generated in the VNF or in the EM of the VNF. So in this example, a CM 1323 generates Metric Report 1315 and is also a potential source of Migrate Trigger 1324. A D-GW component 1325 can also generate Migrate Trigger 1325. In this embodiment, a first VNFM 1332 manages the CM 1323 whereas a second VNFM 1333 manages the D-GW 1325. Accordingly, VNFM 1332 makes Migration Decision 1334 based on Migrate Policy 1341 upon receipt of Migrate Trigger 1324 from the CM 1323. VFNM 1332 also initiates Migrate Response 1351 to implement Migration Decision 1334. Additionally, VNFM 1333 makes Migration Decision 1335 based on Migrate Policy 1342 upon receipt of Migrate Trigger 1326 from the D-GW1325. VFNM 1333 also initiates Migrate Response 1352 to implement Migration Decision 1334. It is noted that Migrate Policy 1341 can differ from Migrate Policy 1342. For example, if the CM is common to many UEs then it does not have to migrate along with the D-GW. Otherwise, if it is user specific, it could move along with the D-GW.

In another embodiment, a VNF can send the Metric Report to the VNFM and another VNF. The second VNF can forward the report to its own VNFM. Each VNFM makes the Migrate Decision individually by checking the Migrate Trigger with the Migrate Policy. FIG. 13C illustrates an example of this option for the migration of one or more D-GW components. In this example, CM 1312 is managed by VNFM1336, whereas D-GW 1327 is managed by VFNM 1339. CM 1312 generates Metric Report 1313 which is forwarded to both the VNFM 1336 and the D-GW 1327. The D-GW 1327 in turn generates its own Metric Report 1328, for example by supplementing the received Metric Report 1313, and forwards Metric Report 1328 to VNFM 1339.

Accordingly, VNFM 1333 makes a Migration Decision 1343 based on Migrate Policy 1345 in response to Migrate Trigger 1337. VFNM 1336 also initiates Migrate Response 1353 to effect Migration Decision 1343. Additionally, VNFM 1339 makes Migration Decision 1346 based on Migrate Policy 1347 in response to Migrate Trigger 1338. VFNM 1333 also initiates Migrate Response 1354 to effect Migration Decision 1346. Once again, Migrate Policy 1345 can differ from Migrate Policy 1347. In this example, the CM need not necessarily migrate as often as the VNFCs of the D-GW.

In some embodiments, the Migrate Decision and Migrate Response can be merged into one function because in all the options they belong to the same entity (namely the VNFM).

It should be noted that, depending on network infrastructure and bandwidth, it can take a period of time to instantiate and configure a VNFC, which may be too long for some applications. Accordingly, in some embodiments, the system attempts to instantiate and configure VNFCs before they are needed so that they can be ready for use when they are needed. Accordingly, in some embodiments, as soon as an AP detects a wireless device, a VNFC is instantiated at that AP. Then, if the signal strength improves, the VNFC can be configured in order to decrease the time needed to have the VNFC active should the CM or another component decide that the AP should start to serve the wireless device.

In some embodiments, the CM can provide a predicted location for the UE in the Metric Report in order to trigger the instantiation of a new VNFC for the D-GW at the predicted PoP. For example, if the UE is moving along a predefined route (e.g. moving on a highway to a known destination, such as an ambulance that is transporting a patient to a hospital), the VNFCs can be proactively set up to ensure that they are instantiated, configured and active in time to serve the approaching UE. In future networks, higher level functions can determine the need for a potential transition. For example, if a wireless device has requested a download, the system can change the state of VNFCs so that they are active and ready to buffer packets for the download, rather than wait for the download packets to flow.

If a non-virtualized element is deployed, as noted above, in place of an instantiation command, a function initialization command can be used. Where decisions to scale up or scale down can be made for a virtualized component, a physical NF may have only allocated a percentage of its available resources to a particular component. This percentage can be varied, which may result in the physical NF being less able to scale up than a VNF would be. Instructions to terminate a VFNC can be replaced with instructions to release the resources a physical NF has allocated to a particular component. Those skilled in the art will appreciate that in some embodiments a mix of virtual and physical functions can be employed.

Figure 14:
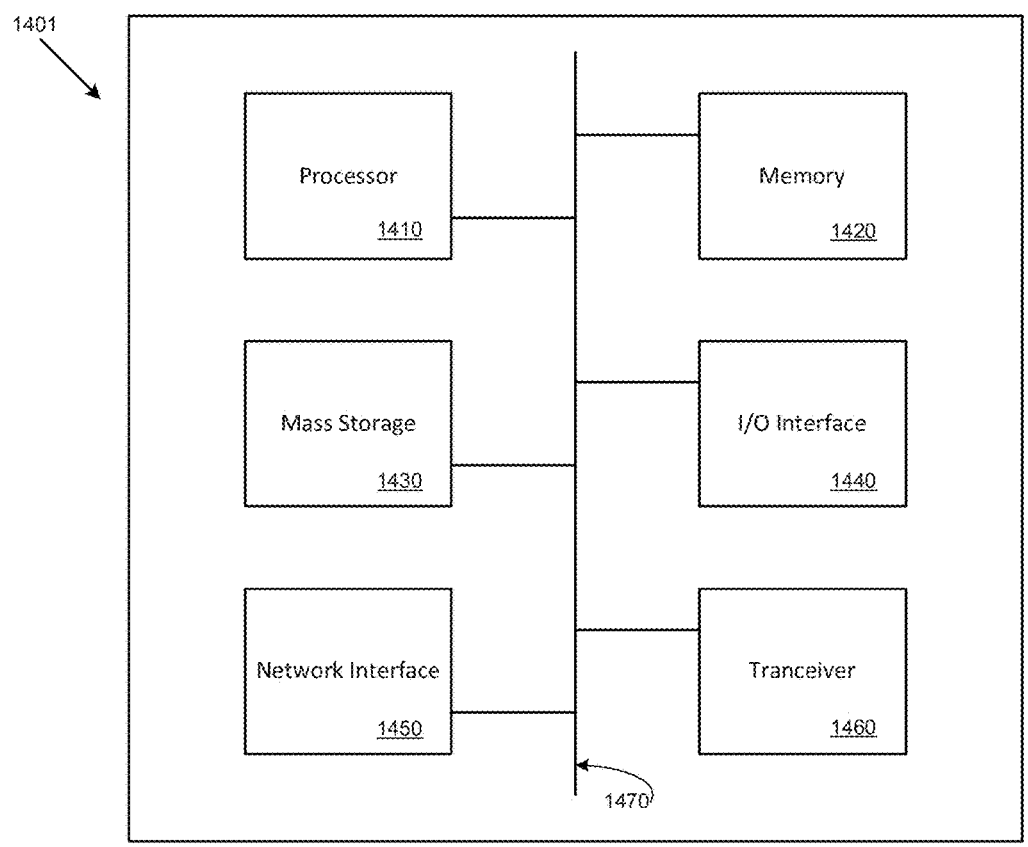
FIG. 14 is an example block diagram of a processing system that may be used for implementing the various network elements which implement the methods discussed herein, according to an embodiment.

FIG. 14 is an example block diagram of a processing system 1401 that may be used for implementing the various network elements which instantiate the D-GW applications, for example the VNFM. As shown in FIG. 14, processing system 141 includes a processor 1410, working memory 1420, non-transitory storage 1430, network interface, I/O interface 1440, and, depending on the node type, a transceiver 1460, all of which are communicatively coupled via bi-directional bus 1470.

According to certain embodiments, all of the depicted elements may be utilized, or only a subset of the elements. Further, the processing system 1401 may contain multiple instances of certain elements, such as multiple processors, memories, or transceivers. Also, elements of processing system 1401 may be directly coupled to other components without the bi-directional bus.

The memory may include any type of non-transitory memory such as static random access memory (SRAM), dynamic random access memory (DRAM), synchronous DRAM (SDRAM), read-only memory (ROM), any combination of such, or the like. The mass storage element may include any type of non-transitory storage device, such as a solid state drive, a hard disk drive, a magnetic disk drive, an optical disk drive, a USB drive, or any computer program product configured to store data and machine executable program code. According to certain embodiments, the memory or mass storage have recorded thereon statements and instructions executable by the processor for performing the aforementioned functions and steps.

Figure 15:
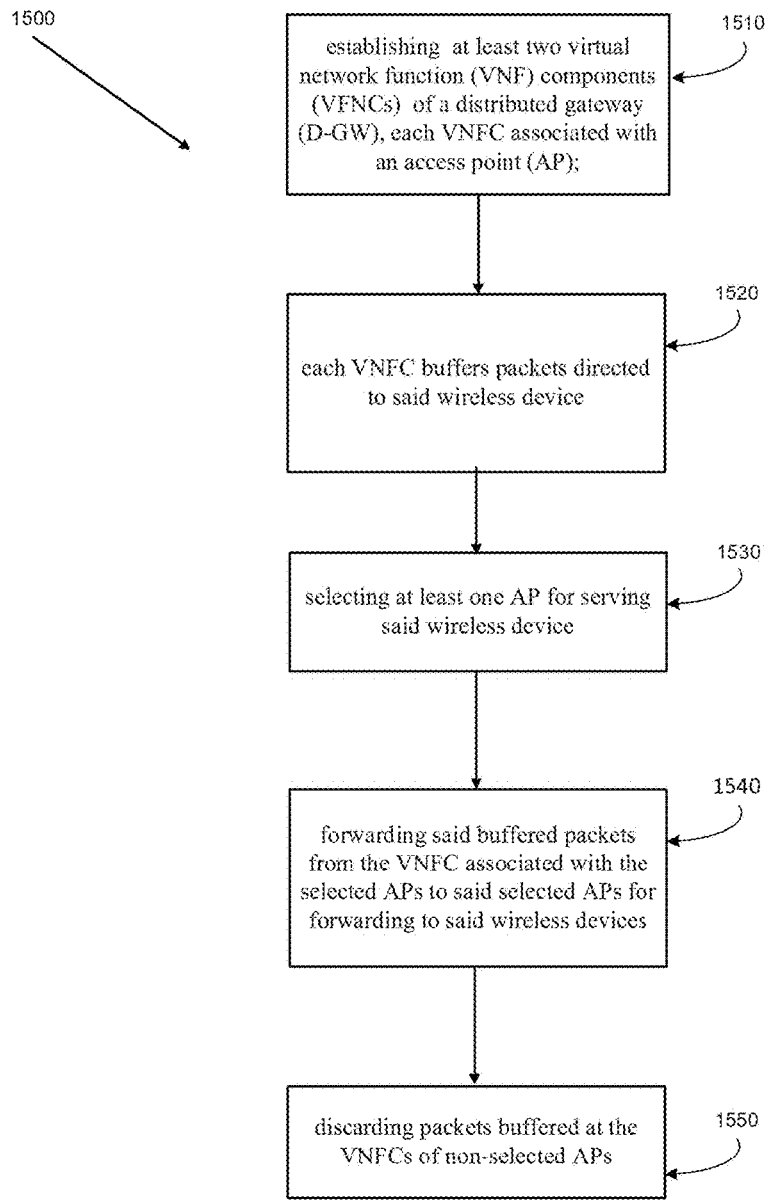
FIG. 15 is a flowchart illustrating a method according to an embodiment.

FIG. 15 is a flowchart illustrating a method according to an embodiment. Such a method 1500 can be executed by a wireless network. Method 1500 includes establishing at least two VFNCs of a D-GW, each VNFC associated with an AP 1510. Each VNFC buffers packets directed to wireless device 1520. The method further includes selecting at least one AP for serving wireless device 1520. In some embodiments, each wireless device would be served by a single AP. However, in some situations, for example, depending on whether the network utilizes a joint transmission scheme (e.g., Co-ordinated MultiPoint transmission/reception (CoMP)), a wireless device may be served by more than one AP at the same time. The method further includes forwarding the buffered packets from the VNFC associated with the selected APs to the selected APs for forwarding to wireless devices 1540. The method also includes discarding packets buffered at the VNFCs of non-selected APs 1550.

Figure 16:
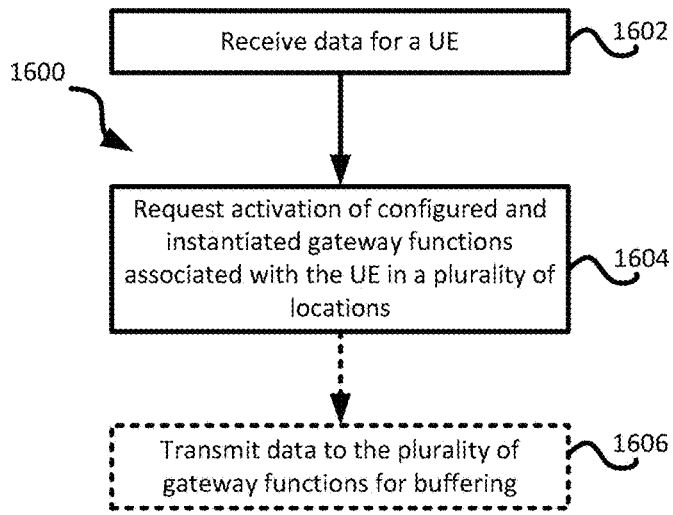
FIG. 16 is a flowchart illustrating a method for execution at an anchoring gateway.

FIG. 16 is a flowchart illustrating a method 1600 for execution at an anchoring gateway. The AGW receives data addressed to a UE in step 1602. In step 1604, the AGW requests activation of configured and instantiated gateways associated with the UE. These gateway functions should be geographically distributed. This request may include a request to instantiate and configure new gateway functions. In optional step 1606, the AGW forwards data to the activated gateway functions. These gateways together form the D-GW, and will buffer the received data. At a later point the CM or the SDN-C can instruct one of the gateways to transmit the buffered data to the UE.

Figure 17:
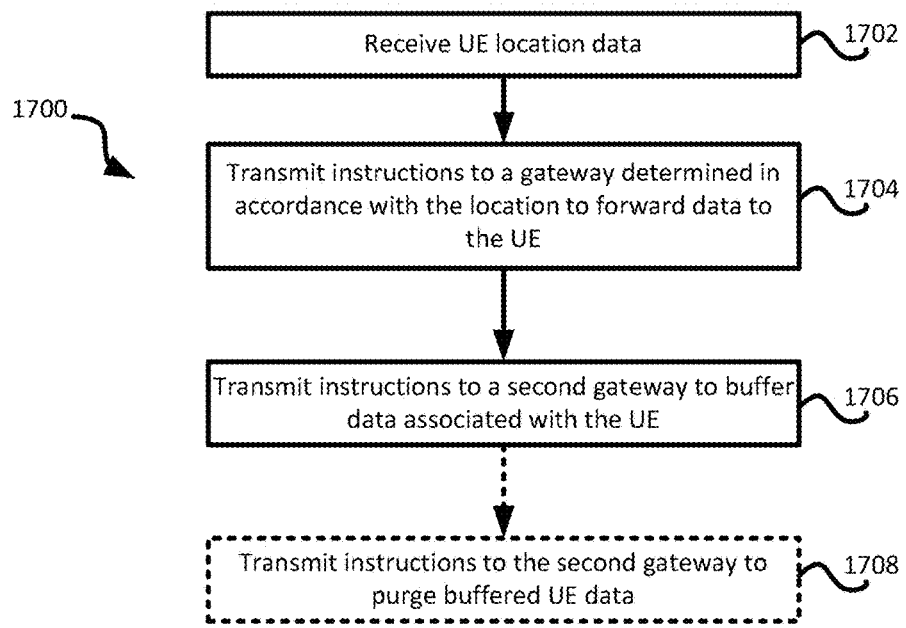
FIG. 17 is a flowchart illustrating a method for execution at a connection manager or a software defined network controller.

FIG. 17 is a flow chart illustrating a method 1700 for execution at either the SDN-C or the CM. In step 1702 the control node (either the CM or the SDN-C) receives information about the location of the UE. The CM typically receives this information as a result of a page of the UE (as shown in FIGS. 9 and 10). In step 1704, instructions are sent to one of the gateways to have the gateway transmit buffered packets to the UE. In step 1706 instructions are sent to a gateway other than the previous one to buffer data addressed to the UE. In optional step 1708, an instruction is sent to the gateways that were buffering data for the UE to flush their queues.

Figure 18:
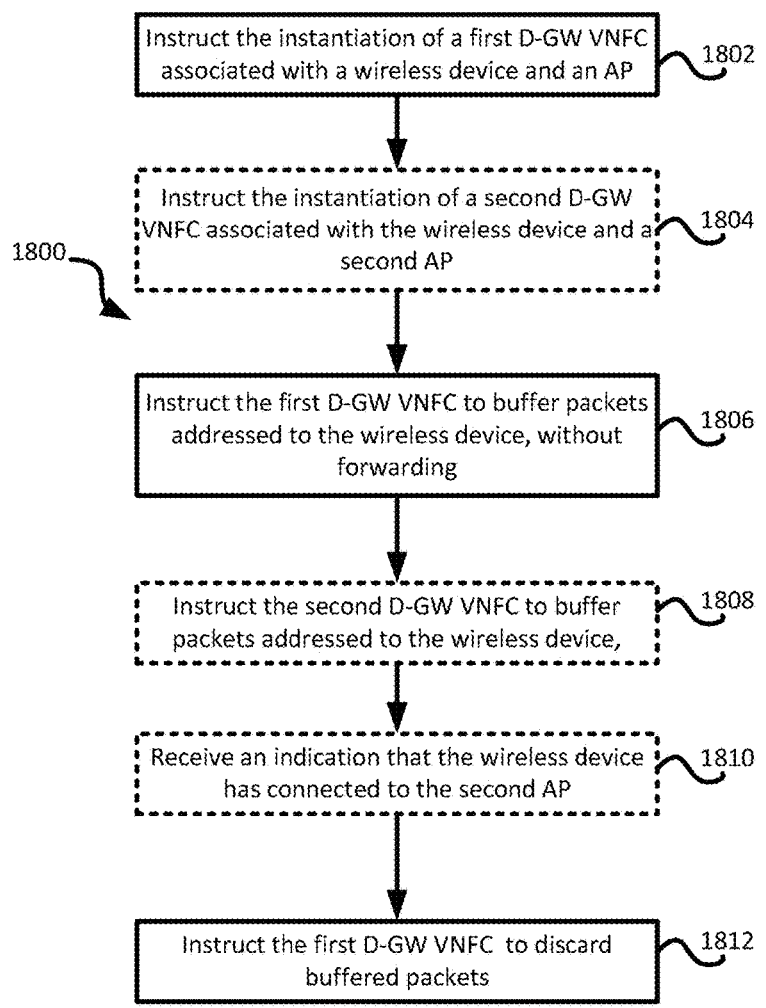
FIG. 18 is a flowchart illustrating a method for execution at a control node.

FIG. 18 is a flow chart illustrating a method 1800 for execution at a control node in the network. In step 1802, the instantiation of a first D-GW VNFC is instructed. This D-GW VNFC is associated with both a wireless device (also known as a mobile device, an example of which is a UE) and an Access Point (such as a base station). In step 1806, the instantiated D-GW VNFC is sent instructions to buffer packets without forwarding them. In an optional step 1805, an instruction to instantiate a second D-GW VNFC associated with another AP is issued. The second D-GW VNFC can be instructed to buffer packets addressed to the wireless device in step 1808. In step 1812 the first D-GW VNFC is instructed to discard the buffered packets. This is optionally done in response to receive, in step 1810, of an indication that the wireless device has connected to an AP other than the first AP (as illustrated, the second AP).

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be ROM, RAM, Flash memory, compact disk read-only memory (CD-ROM), USB flash disk, removable hard disk, or the like. The software product includes a number of instructions that enable a processor to execute the methods provided in the embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method, for execution by a Connectivity Manager, of controlling traffic to a user equipment (UE), the method comprising:
   receiving, by the Connectivity Manager, an indication of a UE location associated with the UE;
   transmitting, by the Connectivity Manager, towards a first virtual network function component (VNFC) selected in accordance with the received indication of the UE location, first instructions to forward, to the UE, received packets associated with the UE; and
   transmitting, by the Connectivity Manager, towards a second VNFC, second instructions to buffer the received packets associated with the UE.

2. The method of claim 1, further comprising receiving the indication of the UE location from an access node.

3. The method of claim 2, the indication of the UE location comprising an identification of the access node.

4. The method of claim 1, the first VNFC being selected in accordance with an access node from which the indication of the UE location is received.

5. The method of claim 1, the transmitting the first instructions to forward the received packets comprising transmitting a message determined in accordance with the indication of the UE location to a Software Defined Network controller.

6. The method of claim 1, further comprising transmitting towards the first VNFC and the second VNFC an update to a forwarding rule determined in accordance with a revised indication of the UE location.

7. The method of claim 6, the revised indication being received from the second VNFC.

8. The method of claim 6, the transmitting the update to the forwarding rule comprising transmitting a message determined in accordance with the revised indication of the UE location to a Software Defined Network Controller.

9. The method of claim 1, the first VNFC and the second VNFC being associated with a distributed gateway (D-GW).

10. The method of claim 9, the first VNFC being different from the second VNFC.

11. A Connectivity Manager configured to control traffic to a user equipment (UE), the Connectivity Manager comprising:
    a non-transitory memory storage comprising execution instructions; and
    one or more processors in communication with the memory storage, wherein the one or more processors execute the execution instructions to:
      receive an indication of a UE location associated with the UE;
      transmit, towards a first virtual network function component (VNFC) selected in accordance with the received indication of the UE location, first instructions to forward, to the UE, received packets associated with the UE; and
      transmit towards a second VNFC, second instructions to buffer the received packets associated with the UE.

12. The Connectivity Manager of claim 11, wherein the one or more processors execute the execution instructions to receive the indication of the UE location from an access node.

13. The Connectivity Manager of claim 12, wherein the indication of the UE location comprises an identification of the access node.

14. The Connectivity Manager of claim 11, wherein the first VNFC is selected in accordance with an access node from which the indication of the UE location is received.

15. The Connectivity Manager of claim 11, wherein the first instructions include a message determined in accordance with the indication of the UE location to a Software Defined Network controller.

16. The Connectivity Manager of claim 11, wherein the one or more processors execute the execution instructions to transmit towards the first VNFC and the second VNFC an update to a forwarding rule determined in accordance with a revised indication of the UE location.

17. The Connectivity Manager of claim 16, wherein the revised indication is received from the second VNFC.

18. The Connectivity Manager of claim 16, wherein the update to the forwarding rule comprises a message determined in accordance with the revised indication of the UE location to a Software Defined Network Controller.

19. The Connectivity Manger of claim 11, wherein the first VNFC and the second VNFC are associated with a distributed gateway (D-GW).

20. The Connectivity Manger of claim 19, wherein the first VNFC is different from the second VNFC.

* * * * *